United States Patent [19]  
Reichman et al.

[11] Patent Number: 4,716,088  
[45] Date of Patent: Dec. 29, 1987

[54] ACTIVATED RECHARGEABLE HYDROGEN STORAGE ELECTRODE AND METHOD

[75] Inventors: Benjamin Reichman, Birmingham; Srini Venkatesan, Southfield; Michael A. Fetcenko, Royal Oak; Kenneth Jeffries, Pontiac; Sharon Stahl, Mt. Clemens; Clifford Bennett, Clarkston, all of Mich.

[73] Assignee: Energy Conversion Devices, Inc., Troy, Mich.

[21] Appl. No.: 947,148

[22] Filed: Dec. 29, 1986

[51] Int. Cl.[4] .................. H01M 4/36; H01M 10/44
[52] U.S. Cl. .................................. 429/101; 429/209; 429/218; 29/623.1; 420/900; 423/644
[58] Field of Search ............... 429/59, 94, 101, 209, 429/218, 40–42; 423/644; 420/900, 424, 580; 252/181.6; 204/2.1; 29/623.1

[56] References Cited  
U.S. PATENT DOCUMENTS

| | | | |
|---|---|---|---|
| 3,669,745 | 6/1972 | Beccu | 429/218 X |
| 3,824,131 | 7/1974 | Beccu | 429/220 X |
| 4,112,199 | 9/1978 | Dunlop et al. | 429/101 X |
| 4,160,014 | 7/1979 | Gamo et al. | 423/644 |
| 4,551,400 | 11/1985 | Sapru et al. | 429/94 |

Primary Examiner—Anthony Skapars  
Attorney, Agent, or Firm—Richard M. Goldman; Marvin S. Siskind

[57] ABSTRACT

Activated rechargeable hydrogen storage electrodes that are especially suitable for sealed, starved electrochemical cells and methods for making them are provided. The activated electrode includes a body of hydrogen storage active material that is composed of an agglomeration of particles of active hydrogen storage material. The body contains a residual amount of hydrogen and may have a modified surface, the residual amount of hydrogen generally being equivalent to a potential of about −0.7 volts versus a Hg/HgO reference electrode when discharged at a rate of about 5 mA/gram to 25 mA/gram of active material.

The method provided for activating a rechargeable hydrogen storage negative electrode includes contacting the electrode with alkaline material for sufficient time at sufficient temperature to alter the surface oxides on the electrode present on the electrodes after fabrication to increase the charge acceptance and electrochemical hydrogen transfer rate and discharging at least a portion of the initial charge present in the electrode. The surface oxides may be treated by several methods, such as by contact with alkaline material or electrochemically.

141 Claims, 10 Drawing Figures

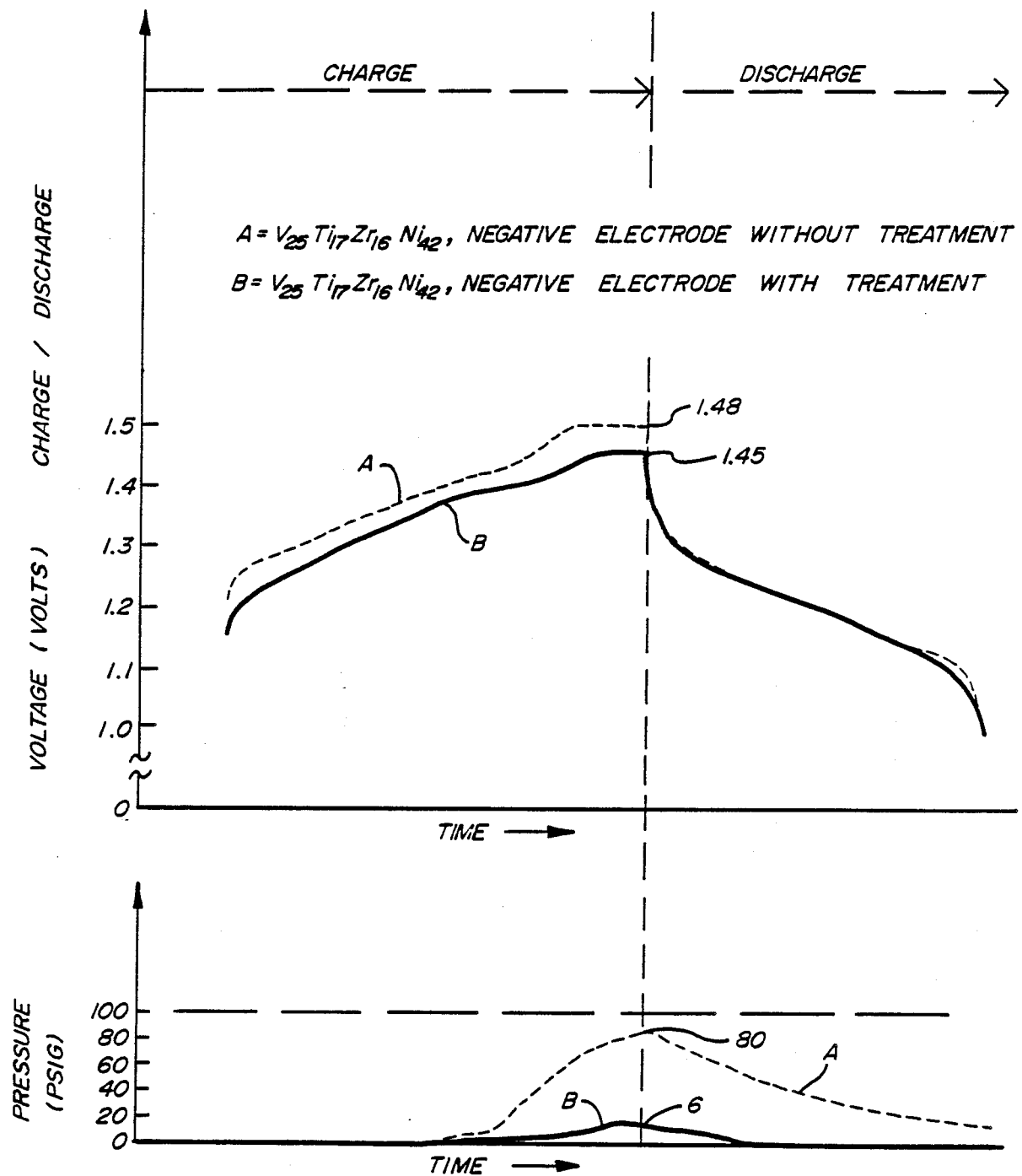

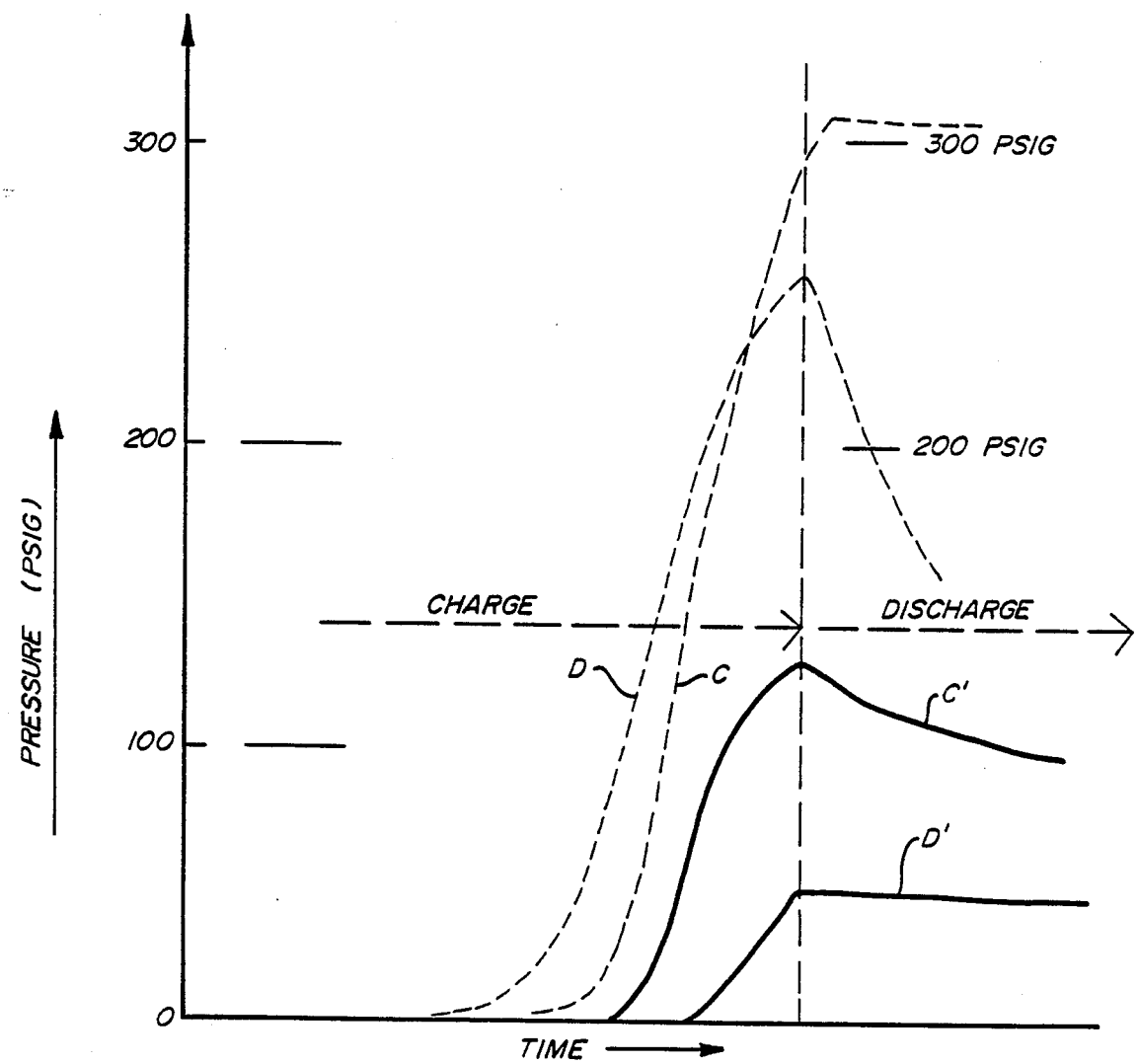

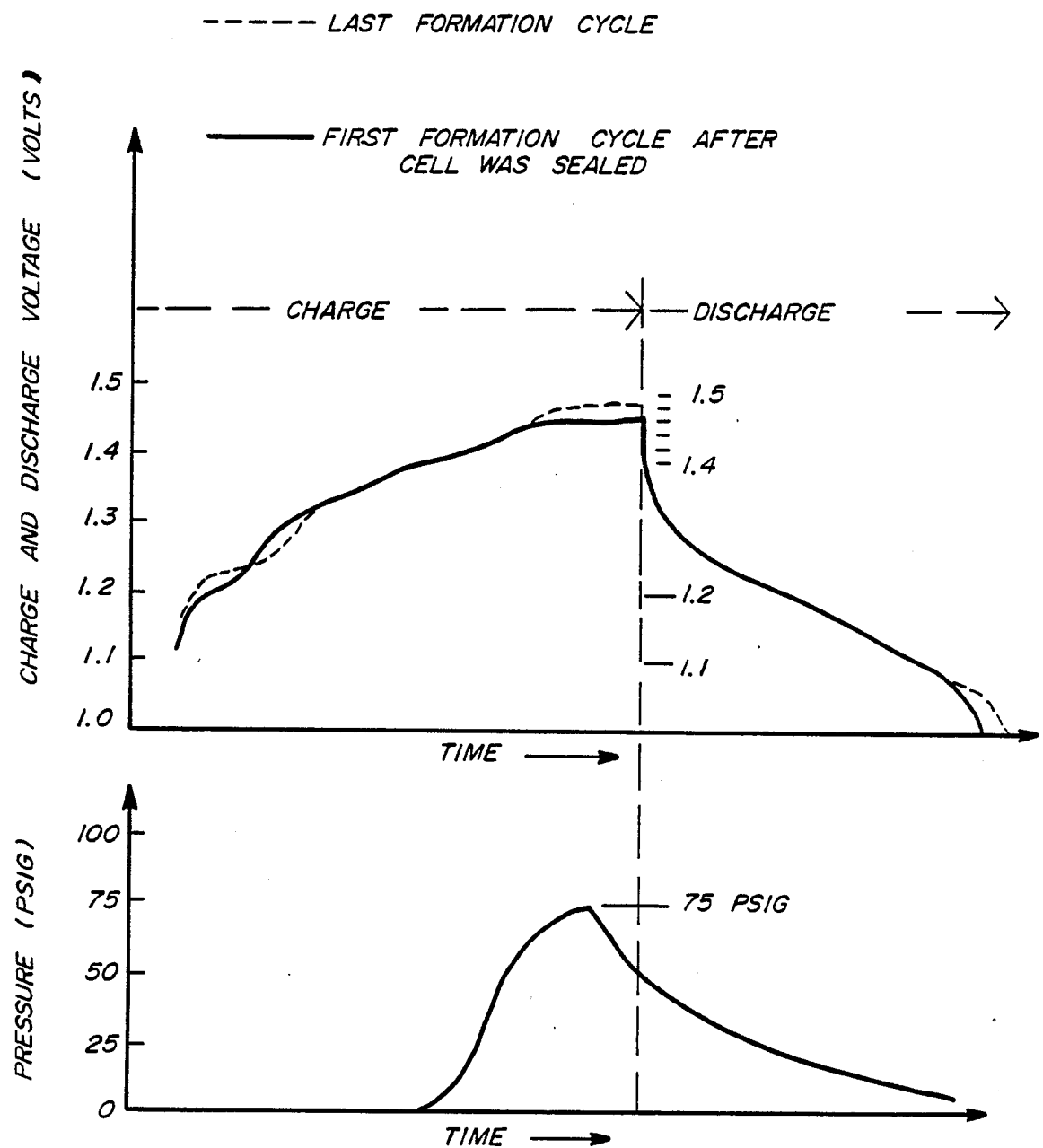

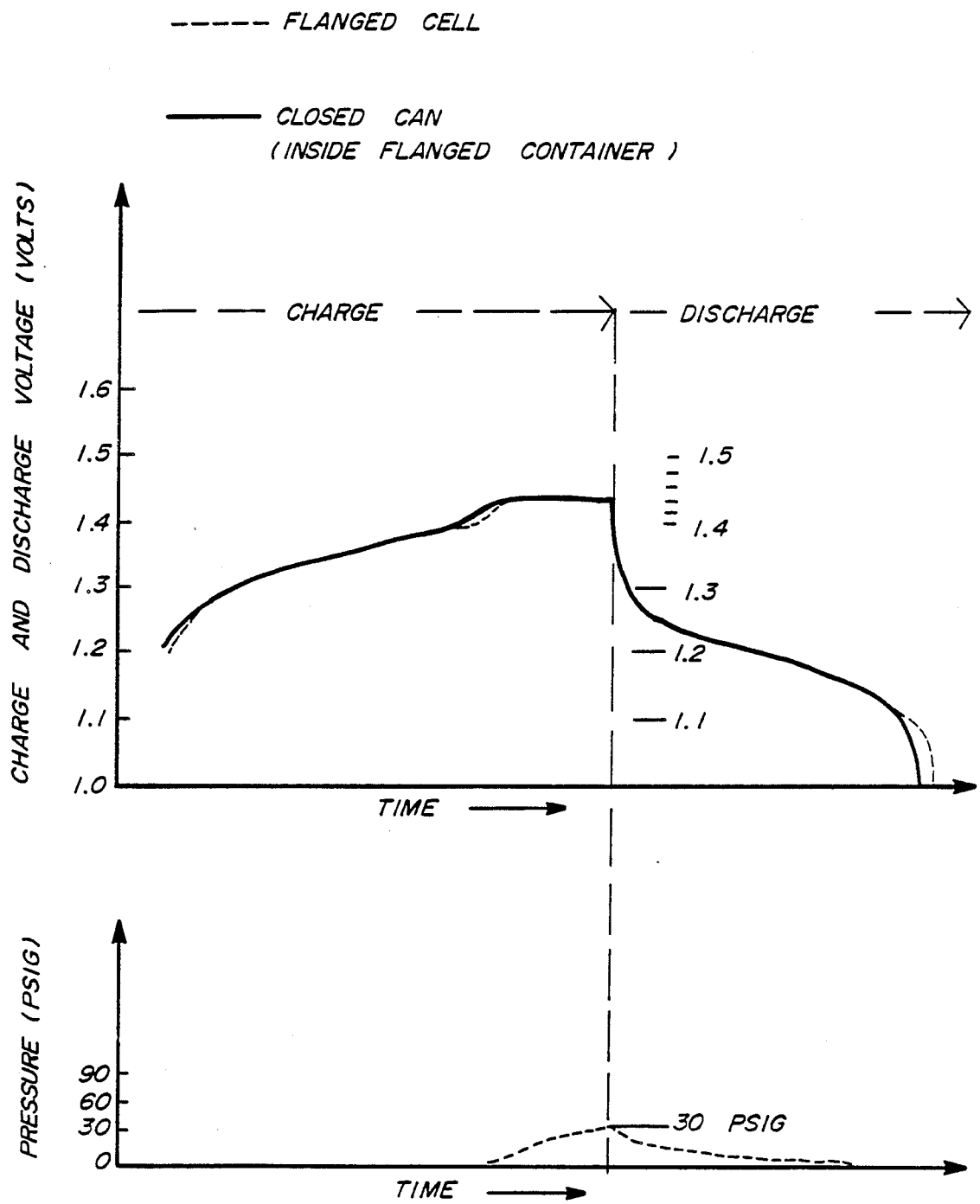

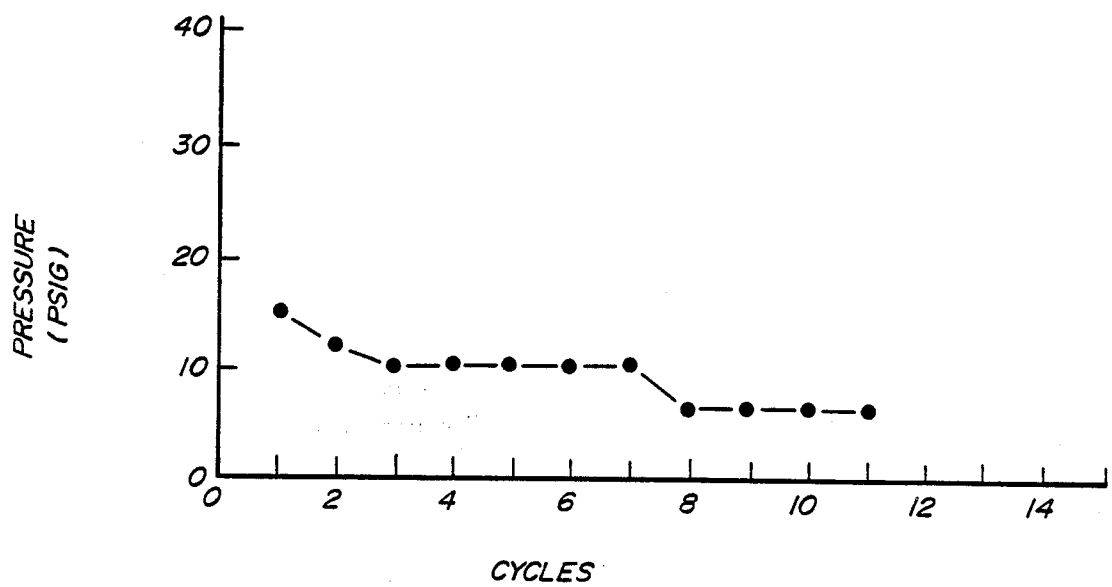

ACTIVATED RECHARGEABLE HYDROGEN STORAGE ELECTRODE AND METHOD

FIELD OF THE INVENTION

The present invention relates to rechargeable hydrogen storage electrochemical cells. More particularly, the invention relates to hydrogen storage negative electrodes for rechargeable batteries.

BACKGROUND OF THE INVENTION

Secondary batteries using a hydrogen rechargeable negative electrode are known. These batteries operate in a different manner than lead acid, nickel-cadmium or other battery systems. The rechargeable hydrogen storage electrochemical cell or battery utilizes a negative electrode that is capable of reversibly electrochemically storing hydrogen and usually employs a positive electrode of nickel hydroxide material. The negative and positive electrodes are spaced apart in an alkaline electrolyte. Upon application of an electrical current to the negative electrode, the negative electrode material (M) is charged by the absorption of hydrogen:

$$M + H_2O + e^- \rightarrow M-H + OH^- \quad \text{(Charging)} \quad (1)$$

Upon discharge, the stored hydrogen is released to provide an electric current:

$$M-H + OH^- \rightarrow M + H_2O + e^- \quad \text{(Discharging)} \quad (2)$$

The reactions are reversible, and this is also true of the reactions that take place at the positive electrode. As an example, the reactions at a conventional nickel hydroxide positive electrode as utilized in a hydrogen rechargeable secondary cell or battery are as follows:

$$Ni(OH)_2 + OH^- \rightarrow NiOOH + H_2O + e^- \quad \text{(Charging)} \quad (3)$$

$$NiOOH + H_2O + e^- \rightarrow Ni(OH)_2 + OH^- \quad \text{(Discharging)} \quad (4)$$

A battery utilizing an electrochemically hydrogen rechargeable negative electrode can offer important potential advantages over conventional secondary batteries. Hydrogen rechargeable negative electrodes should offer significantly higher specific charge capacities than lead or cadmium negative electrodes. Furthermore, lead acid batteries and nickel-cadmium type secondary batteries are relatively inefficient, because of their low storage capacity and cycle life. A higher energy density should be possible with hydrogen storage batteries than these conventional systems, making them particularly suitable for many commercial applications.

Suitable active materials for the negative electrode are disclosed in U.S. Pat. No. 4,551,400 to Sapru et al. These materials reversibly form hydrides in order to store hydrogen. Such materials have compositions of:

$$(TiV_{2-x}Ni_x)_{1-y}M_y$$

where $0.2 \leq x \leq 1.0$, $0 \leq y \leq 0.2$ and M=Al or Zr;

$$Ti_{2-x}Zr_xV_{4-y}Ni_y$$

where, $0 < x \leq 1.5$, $0.6 \leq y \leq 3.5$ and $$Ti_{1-x}Cr_xV_{2-y}Ni_y$$

where, $0 < x \leq 0.75$, $0.2 \leq y \leq 1.0$. Reference may be made to U.S. Pat. No. 4,551,400 for further descriptions of such materials and for methods of making them. Other suitable materials may also be used for the rechargeable hydrogen storage negative electrode.

The negative hydrogen storage electrode can be made by sintering particulate active material with a binder, such as nickel, that has been compressed. The compressed material is sintered in a suitable atmosphere, such as argon and hydrogen.

One problem that has been encountered in battery cells that use hydride materials as a negative rechargeable hydrogen storage electrode is that freshly made cells may not be able to deliver the expected high capacity even after multiple charge and discharge cycling of the sealed cells. In addition, even in cells that deliver the expected capacity, the pressure that develops during the charging cycle can be high and in some cases, can cause venting of the cell at an early stage.

A need exists for a hydrogen storage electrode and a sealed electrochemical hydrogen storage cell that efficiently utilizes the hydrogen storage capability of the hydrogen storage electrode.

A need also exists for a method of producing rechargeable negative hydrogen storage electrodes and for an improved electrode and cell that does not cause unacceptable or venting levels of pressure as a result of charging or overcharging when utilized in a sealed cell. An electrode having improved capacity and increased discharge rate would also be desirable.

SUMMARY OF THE INVENTION

The present invention allows efficient use of metal hydride electrodes in a sealed cell environment. While use of the materials described in U.S. Pat. No. 4,551,400 is preferred, the invention is believed applicable to any metal hydride electrodes for use in hydrogen storage sealed cells and is especially suitable for sealed, starved electrochemical cells.

Minimizing cell pressure is very important in a successful sealed cell using a metal hydride negative electrode. Most cell pressure develops during overcharging and therefore the overcharge reactions are of importance. In most cell designs utilizing metal hydride negative electrodes, excess negative capacity is added so that the cell capacity is positive limited for both the charge and discharge processes. This is done to provide the following overcharge reactions:

$$OH^- \rightarrow \tfrac{1}{4}O_2 + \tfrac{1}{2}H_2O + e^- \text{ (at the positive electrode)} \quad (5)$$

$$MH + \tfrac{1}{4}O_2 \rightarrow M + \tfrac{1}{2}H_2O \text{ (at the negative electrode)} \quad (6)$$

where the ideal reaction has oxygen produced at the positive electrode recombining at the negative electrode to form water. With excess negative capacity, it is designed so that the negative electrode never becomes fully charged. A fully charged negative electrode would be undesirable since molecular hydrogen produced at a fully charged negative cannot recombine and the cell pressure would become extremely high until the cell would overpressure and vent. The use of excess negative capacity could prevent negative overcharge and hydrogen gas evolution if ideal electrodes were available. However, available metal hydride electrodes are not ideal and the following competing reaction can take place at the negative electrode:

$$H_2O + e^- \rightarrow \tfrac{1}{2}H_2 + OH^- \quad (7)$$

where hydrogen gas is evolved. Once overcharge is completed, the evolved hydrogen gas will be reabsorbed at the negative. However, during charge and overcharge, the hydrogen pressure in the sealed cell can become very high, sometimes greater than 400 psi. Thus, it is desirable to minimize the cell pressure as much as possible.

Even with excess negative capacity to prevent the negative electrode from becoming fully charged, it is still possible for reaction (7) to take place. In accordance with the present invention, the degree to which reaction (7) takes place can be controlled and maintained at acceptable levels.

The present invention, which, in accordance with one aspect, can be referred to as "negative electrode activation," prepares the negative electrode for use in a sealed cell environment. The techniques of activation alter the physical and chemical properties of the negative electrode in such a way that reaction (7), causing hydrogen gas evolution, is minimized thereby preventing cell pressure from reaching unacceptable levels.

In accordance with one aspect of the present invention, a method is provided by which rechargeable hydrogen storage negative electrodes for electrochemical cells are activated so that unacceptable pressure levels during charging and overcharging are avoided. In addition, increases in capacity and discharge rate are provided, while a reduction in the charging voltage is also provided.

The hydrogen storage electrode exhibits improved charge acceptance and hydrogen transfer properties. The method of activating can also render the electrode surface substantially free from material that is soluble in aqueous metal hydroxide solutions, resulting in improved performance. The method of activating the hydrogen storage electrode can also result in the electrode having a concentration of at least 20% on an atomic basis of free metal at the surface of the electrode to a depth of about 100 angstroms from the the surface and can also increase the surface area of the electrode, resulting in improved performance. The surface porosity from the surface of the electrode to a depth of at least about 100 angstroms from the surface may be increased from essentially 0% to at least 1% and preferably about 10%, thereby resulting in improved electrode performance.

More specifically, in accordance with one aspect of the invention, a method of activating a hydrogen storage rechargeable negative electrode having surface oxides after fabrication is provided. The method includes treating, such as by removing or altering at least a portion of the surface oxides to permit greater charge acceptance and increasing the electrochemical hydrogen transfer prior to installation and sealing of the electrode in a hydrogen storage electrochemical cell. The oxides may be remoVed or altered chemically, such as by contact with an alkaline solution, or electrochemically. An electrode and electrochemical cell made in accordance with this method are also provided.

In accordance with another aspect of the present invention, a method of activating a rechargeable hydrogen storage negative electrode or electrode material having an initial state of charge, surface area and surface oxides after fabrication is provided. This method comprises, prior to installation and sealing of the electrode in a hydrogen storage electrochemical cell, treating at least a portion of the surface oxides to increase the charge acceptance and electrochemical hydrogen transfer rate and discharging at least a portion of the initial charge whereby the molecular hydrogen gas pressure that develops in a sealed negative electrode hydrogen storage rechargeable electrochemical cell utilizing said electrode is reduced. This method can provide an electrode surface area suitable for use in a sealed cell. An electrode and electrochemical cell made in accordance with this method are also provided.

In accordance with still another aspect of the present invention, a method of fabricating a hydrogen storage electrochemical cell is provided in which a positive electrode, a rechargeable hydrogen storage negative electrode, separator and electrolyte are assembled in operative contact and contained within container means and wherein said hydrogen storage negative electrode has an initial state of charge, surface area and surface oxides after fabrication, comprising: activating said hydrogen storage negative electrode prior to installation and sealing of the electrode in the hydrogen storage electrochemical cell by a method comprising treating at least a portion of the surface oxides to increase the charge acceptance and electrochemical hydrogen transfer rate maximizing electrode surface area and discharging at least a portion of the initial charge whereby the gas pressure that develops in the sealed hydrogen storage rechargeable electrochemical cell is reduced. Such treatment usually has the effect of increasing the surface roughness of the electrode.

In accordance with another aspect of the present invention, a method of activating a rechargeable hydrogen storage negative electrode or electrode material having an initial state of charge and surface oxides after fabrication is provided. This method comprises, prior to installation and sealing of the electrode in a hydrogen storage electrochemical cell, holding the said negative electrode at a sufficiently anodic potential versus a Hg/HgO/OH$^-$ reference electrode using a potentiostat, for example, such that corrosion of one or more of the active components of the substrate matrix takes place. Also, the surface oxides are converted to certain oxidation states where they dissolve more easily, thus activating the surface. By holding at anodic potentials, the electrode is subjected to discharge process at constant potential. Thus, a predischarge takes place, setting the state of charge. The controlling factors in this operation are the anodic potential value and the time of keeping it at that value.

In accordance with the device aspects of the invention, an activated rechargeable hydrogen storage negative electrode is provided that is ready for installation to make a sealed, starved electrochemical cell. The negative electrode comprises a body of hydrogen storage active material that is composed of an agglomeration of particles of active hydrogen storage material substantially free of surface oxides and contains a residual amount of hydrogen equivalent to a −0.7 volt cutoff versus a Hg/HgO/OH$^-$ reference electrode when discharged at a rate of about 5 mA/gram to 25 mA/gram of active material, and the electrode usually has an increased surface area.

In accordance with another aspect of the invention, an electrochemical cell is provided. The electrochemical cell is a hydrogen storage cell that includes a positive electrode, a negative electrode, a separator, electrolyte and a sealed container that contains the positive and negative electrodes, separator and electrolyte. The negative electrode is an electrode in accordance with the invention as previously described.

BRIEF DESCRIPTION OF THE DRAWINGS

The present invention can be more completely understood by reference to the accompanying drawings in which:

FIG. 4 is a graph illustrating the maximum pressure of a sealed electrochemical cell as a function of the number of charge and discharge cycles;

DETAILED DESCRIPTION

Figure 1:
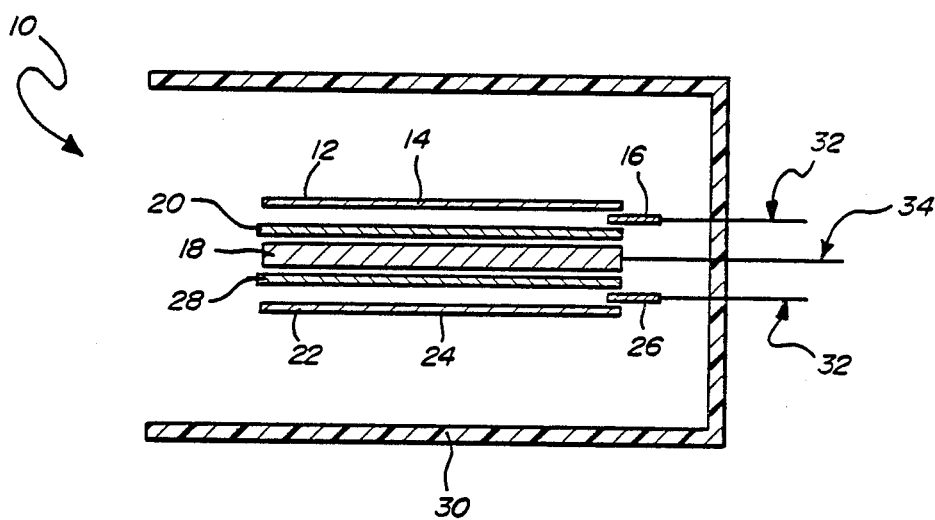
FIG. 1 is a sectional side view of a flat electrochemical cell having a negative electrode in accordance with the invention.

The negative electrode active material can be obtained by any method known to those skilled in the art. For example, the material can be obtained in bulk by melting a desired combination of elements and thereafter solidifying the combination to prepare the desired solid mixture. Thereafter, the bulk active material is formed into the desired particle size. Any suitable technique can be utilized to form the bulk material into particulate form. For example, physically breaking or grinding can be used. Preferably, the bulk material is reduced in size by hydriding the bulk material into a flaky, ash-like consistency. Thereafter, the material is dehydrided, either before or after pulverizing the material to the desired size.

It is important to note that some hydrogen storage electrode materials have better inherent properties than others. While the present invention is believed applicable to all metal hydride systems, it is to be understood that the specific conditions obtained from different materials may vary.

The hydriding step includes contacting the bulk material with hydrogen gas under the appropriate temperature, pressure, and time conditions to form the hydride of the material. More specifically, an ingot of the material may be placed in a reaction vessel. The vessel is subsequently sealed and evacuated. Generally, a pressure of about $10^{-3}$ torr is suitable. The vessel is then pressurized with hydrogen gas between about 100 to 2000 psi. Generally, maintaining a partial pressure of hydrogen above about 200 psi for a few minutes is sufficient to form the hydride at room temperature. These conditions depend on the composition of the material and its geometry. Materials that have a slower diffusion rate or low interstitial mobility for hydrogen will require more time for suitable embrittlement. The factors that affect the mobility of hydrogen through the phase regions and of the material's structure will determine the pressure, time, and temperature necessary to form a hydride of the material and effectuate suitable embrittlement.

The vessel may be cooled during the hydriding step to prevent any temperature increase. The temperature inside the vessel rises as the material is exposed to the hydrogen due to the exothermic nature of the hydride formation reaction (approximately 10 kcal/mole for these materials). Without any cooling, the temperature inside the vessel usually elevates to about 250° C. A temperature increase delays the formation of the hydride. The hydriding reaction spontaneously starts upon exposure to hydrogen gas. If a barrier or passivation layer forms on the surface of the material which prevents contact with the hydrogen gas, the layer should be removed. For example, if an oxide layer forms on the material, the hydrogen initially will slowly penetrate. Initial heating of the material accelerates the hydriding step. Once a portion of new surface is formed during hydriding, the hydriding reaction proceeds rapidly without further assistance.

Hydride formation of a material batch can be modelled by the ideal gas law. Sufficient embrittlement for easy size reduction of some materials does not require complete hydride formation. For example, with a material such as $V_{53}Ti_{33}Ni_{14}$ which absorbs about 2.5 weight percent hydrogen, it was found that hydriding to at least about 1.5 weight percent hydrogen provides sufficient embrittlement. Using the ideal gas law and the amount of hydrogen absorbed for sufficient embrittlement, the reaction vessel necessary to embrittle a given batch of material can be readily calculated.

Another step of the process is the dehydriding of the material. Dehydriding the material takes place after the material has been sufficiently embrittled by hydride formation and returns the material to its metallic form.

Specifically, dehydriding includes evacuating the vessel with the hydride still inside the reaction vessel and with heating for a sufficient time period to induce release of the incorporated hydrogen. The material should be kept at a temperature sufficiently low to avoid changing the structure of the material. A temperature below 600° C. is usually suitable. The dehydriding step is more quickly completed as the temperature increases. A temperature of about 400° C. is preferred. As the hydrogen is removed from the vessel it may be compressed and recycled since it is largely uncontaminated.

After the hydrogen is removed, the material is cooled to room temperature in an inert environment like argon. The resultant material has the ash-like features of the hydride and is relatively inert to atmospheric reaction.

Pulverization of the embrittled material may be accomplished by any conventional device such as mechanical attritors, jaw crushers, air-hammer, hardened steel mortar and pestle, or ball-milling. Ball-milling the material gives a particle size distribution especially useful for the fabrication of hydrogen storage electrodes. The particle size of the material may be varied depending upon the application. The flakes resulting from the embrittlement process are usually about one millimeter in diameter. Care must be taken during the pulverization process not to expose the pulverized material to any conditions which may allow water or oxygen to contact or react with the pulverized alloy. Using other pulverization techniques will produce different distributions of particle sizes, as well as different particle shapes.

It is preferred, although not critical, that the pulverizing step follow the dehydriding step. Several significant advantages are demonstrated if the preferred sequence of steps is followed. First, the hydrided form of the material is very reactive with certain gases like oxygen which would deleteriously offset the electrochemical properties of the material. Pulverizing the material after dehydriding reduces the likelihood of contamination. This is not critical because the material could be pulverized in the hydride form without contamination if care were taken to provide an inert environment. The complexity of the procedure, however, makes it less likely to be economically feasible. Second, a single vessel may be used to hydride and dehydride the material without transporting the material between steps. Thus, contamination and costly handling are avoided.

The fabrication of the electrodes using the above described active material may be carried out by several conventional processes. Preferably, the active materials are mixed with a binder such as nickel in the amount of about 7%. Other binders which promote the mechanical stability of the electrode without deleteriously affecting its electrochemical properties are suitable. The active material and binder is then placed in contact with a current collector. Although nickel mesh screen was used, other current collectors also are suitable. For example, a nickel plated steel or copper current collector could be used. The collector could be a perforated sheet or mesh, for example.

The material is pressed with sufficient pressure to form a body having sufficient green strength for sintering. A typical pressure is in the range of from about 7 to 10 tons/sq.cm. Any of the various known conventional methods for pressing the material can be utilized.

These materials are then sintered in the range of 800° to 1200° C. for a period of several minutes to an hour. Preferably, a temperature of about 1050° C. is used for about five minutes. As the temperature of the sintering process decreases, the length of time for sintering increases. It is economically preferable to have a higher sintering temperature for a shorter period of time.

Generally, hydrogen will be present in the sintering atmosphere. The amount of hydrogen may be from 0% to 100%, and preferably about 4%, on a volumetric basis, with the remainder of the sintering atmosphere, other than trace impurities, being an inert gas, such as argon.

After sintering or fabrication has been completed, the negative electrode structure is further treated in accordance with the invention. As used herein "fabrication" means that the negative electrode has the physical integrity that would allow its use in an electrochemical cell. It is to be understood that fabrication of a negative electrode may not require sintering and the present invention is applicable to hydrogen storage negative electrodes regardless of whether sintering was utilized. Usually, the sintered electrode structure will be a web of a certain width that is usually much wider than the final width of the negative electrode, to increase production efficiency. The web is cut to the width desired for the final electrode before or after further treatment. The final width, of course, depends on the size and type of cell or battery that is intended to be made. Usually, the web is cut to the desired size before further treatment of the negative electrode structure.

As mentioned, even with excess negative electrode capacity, it is possible for reaction (7), hydrogen evolution, to take place and cause evolution of molecular hydrogen at the negative electrode, especially during overcharging:

$$H_2O + e^- \rightarrow \tfrac{1}{2}H_2 + OH^- \tag{7}$$

Factors which contribute are current density, state of charge, and surface condition. In accordance with the invention, these parameters are associated with the negative electrode and are controlled to reduce cell pressure in this invention. It is to be understood that other cell design parameters must be proper for obtaining maximum benefits in accordance with this invention. These additional design parameters are relative electrode capacity, parameters for minimizing oxygen evolution, and electrolyte parameters such as composition, level and purity.

When utilizing metal hydrides as electrochemical storage devices in an alkaline media, the electrode will begin evolving hydrogen when the surface reaches the hydrogen evolution potential. An important factor which influences this potential is current density. Current density is the charging current per unit area. Thus, it is possible to lower the electrode potential and reduce hydrogen evolution by lowering the charge current for a given electrode. However, in practical applications, it is desirable to charge cells as quickly as possible. Therefore, reducing pressure in this manner is only marginally useful. However, the current density can be reduced dramatically by increasing the surface area within the negative electrode. Thus, for a given cell size and charge current, doubling the surface area will decrease the current density by 50%. The materials and electrode fabrication techniques described in U.S. Pat. No. 4,551,400 provide excellent inherent behavior towards maximizing surface area. Practically, however, it is often difficult to fully exploit this parameter. The present invention allows increases in the usable negative electrode surface area.

Another characteristic of metal hydride electrodes which influences pressure is state of charge. For a given cell design and negative electrode, the level of precharge on the negative electrode prior to sealing the cell can influence pressure greatly. Generally, excess negative capacity is needed during charging to prevent the negative from becoming fully charged. Excess negative capacity is also needed during discharge to provide a mechanism for overdischarge. By maximizing the excess negative capacity on charge, cell pressure is lowered. Further, we have discovered that setting the initial level of precharge on the negative electrode prior to sealing the cell is a method for insuring a maximum excess negative capacity on charge. In addition to maximizing electrode surface area, the present invention provides methods which reproducibly set the precharge level in metal hydride negative electrodes.

In the past, it is likely that the lack of compensation for initial state of charge has contributed to the lack of successful commercial application of metal hydrides in sealed electrochemical systems. Metal hydrides suitable for electrochemical applications are generally a subset of metal hydrides for use in purely thermal hydrogen storage systems. The criteria used for establishment of suitability for electrochemical systems is well known in the prior art. The hydrogen storage materials disclosed in U.S. Pat. No. 4,551,400 are particularly well suited for the present invention. However, in the prior art, no disclosure is made of the implications of a concept which is referred to herein as "residual hydrogen." In effect, residual hydrogen is hydrogen which is stored in the active material metal lattice, but cannot be utilized in an electrochemical environment at useful rates. In a prismatic or vented application, this concept is less important. However, it has been discovered that for use in sealed cell applications, setting the initial state of charge of the negative electrode to compensate for residual hydrogen is very important. It has been determined that the appropriate level of precharge for a metal hydride electrode used in an alkaline medium corresponds to a potential of about −0.7 volts versus a Hg/HgO/OH⁻ reference electrode when the electrode is discharged at a rate of about 5 mA/g to about 25 mA/g, where gram refers to the weight of active material within the negative electrode. The present invention can provide the appropriate level of precharge and provides methods of setting the same.

Another important characteristic of metal hydride electrodes which is optimized by the present invention relates to the electrode surface condition. In addition to current density and state of charge, it has been determined that metal oxides at the electrode surface can decrease charging efficiency and promote hydrogen evolution.

In addition to the previous cell reactions, it is also possible for the following reaction to take place:

$$M + \tfrac{1}{2}O_2 \rightarrow MO \tag{8}$$

This type of oxidation of metal hydrides must be avoided or cell capacity and performance will fail to meet or even approach practical levels. The metals which react with hydrogen to form metal hydrides tend to also react with oxygen to form metal oxides. Thermodynamically, the oxides are more stable and this reaction is favored. These factors also relate to the fabrication of the hydride electrodes used in sealed cells. Even under careful fabrication conditions, such as described in U.S. Pat. No. 4,551,400, the metals are so sensitive to oxidation that metal oxide formation can be minimized but not easily eliminated. It has been discovered that without any other treatment, electrodes fabricated under standard processing conditions, as previously described, have a surface oxide. The composition, thickness, and oxidation state of the surface oxide is variable. Factors which can influence the degree of oxidation include: the active material composition, the type of process used to prepare powder for electrodes prior to compaction, the particle size and surface area of the initial active material, the method of compacting the powder, and the method used to sinter the compacted powder. Sintering is not a required processing step. The degree of oxidation will generally increase with longer duration of atmospheric exposure. Generally, the higher the temperature during processing, the greater the likelihood of metal oxide formation. The present invention provides methods to overcome the effect of the initial oxidation resulting from material processing or fabrication.

Overcoming the effects of metal oxides formed during electrode fabrication is crucial to the successful operation of metal hydride electrodes in sealed cell applications. The metal oxides are detrimental to sealed cell performance. First, oxides at the surface have been found to decrease charging efficiency and promote hydrogen evolution. If the degree of oxidation is excessive, a completely discharged electrode will evolve hydrogen on charge, even at low charge currents. This is illustrated by the following equation:

$$H_2O + e^- \rightarrow H + OH^-$$

The atomic hydrogen formed at the surface of the substrate can either recombine with another H and escape as molecular hydrogen or it can react with the substrate to form a hydride. If the substrate metal M is a hydride former, a hydride is formed:

$$M + H \rightarrow MH$$

If M is covered with an oxide, this reaction is inhibited. Since charge is continuing, the coverage with atomic hydrogen at the surface increases, thus increasing the chances of interaction between two adjacent H atoms. This results in more hydrogen evolution. In other words, the hydride formation efficiency is decreased. This increased evolution of hydrogen shows up as an increase of pressure in the sealed cell in the following reaction:

$$H + H \rightarrow H_2 \uparrow$$

Another detrimental effect of metal oxides is the hindrance of new surface area formation. Upon successive charging and discharging cycles, the surface area of a metal hydride electrode can increase tremendously from the initial surface area after fabrication. The degree of surface area increase is related to the composition of the active material, but excessive levels of metal oxide can hinder surface area increase almost completely. Thus, the effects of initial surface oxide are especially important during the initial stages of cell activation. Besides lowering cell pressure by affecting current density, maximized surface area is also important for discharge rate capability and promoting electrode cycle life.

The present invention allows manipulation of one or more of current density, state of charge, and surface condition. It is understood that these parameters can be controlled individually or in combination without violating the spirit and scope of the invention and that some modifications of these techniques could be required for specific materials or conditions.

The aspect of the invention relating to a method for establishing the correct initial state of charge in a metal hydride electrode during fabrication and to the resulting electrode utilizes the concept that a certain electrochemical state of charge corresponds to a specific amount of absorbed hydrogen in the host metal. We have determined that for the alloys specified in U.S. Pat. No. 4,551,400 for use in a sealed cell that a voltage of about −0.7 V vs. a Hg/HgO/OH⁻ reference electrode when discharged at a rate of about 5 to 25 milliamps per gram generally provides good electrochemical performance in sealed cells. As mentioned, conditions specified above constitute an electrochemical reference point. On an absolute scale, the corresponding amount of hydrogen depends upon the properties of the material, and thus on its composition. For example, for a material of composition $V_{33}Ti_{17}Zr_{17}Ni_{33}$, this amount of residual hydrogen is about 0.13 weight percent, where weight percent is the ratio $H/M \times 100$, where H is the weight of hydrogen and M is the weight of the active material. The same electrochemical reference point for the material composition $V_{53}Ti_{17}Cr_{16}Ni_{14}$ is about 0.4 weight percent. This value is easily determined for any material composition using well known techniques in the prior art, for example, such as by techniques used to generate pressure, composition, temperature (PCT) information in thermal systems.

The electrochemical reference point for establishing the appropriate level of precharge is variable. Depending on the specific conditions under which the final cell is used, the precharge level can change. Parameters such as cell discharge rate, operating temperature, sensitivity to oxidation at a given cutout voltage, and necessity for overdischarge protection are just a few examples of how the actual conditions under which the cell operates affect the optimum level of precharge in a metal hydride electrode.

The aspect of the invention relating to setting the appropriate level of precharge during fabrication utilizes this concept. Hydrogen can be introduced during the electrode sintering step. As mentioned in U.S. Pat. No. 4,551,400, the atmosphere used to sinter the named alloys was a mixture of hydrogen and argon, where hydrogen was available at a level of 4 volumetric percent. Using the stated electrode sintering conditions, the level of absorbed hydrogen has been determined to be about 0.44 weight percent, for a material of composition $V_{33}Ti_{17}Zr_{16}Ni_{34}$, which is a much higher level of precharge than is desirable from an electrochemical standpoint for that material. However, by varying the hydrogen level in the sintering atmosphere to 1.0 and 0.5 volumetric percent, the level of precharge was changed to 0.22 and 0.17 weight percent hydrogen, respectively. Reducing the hydrogen level even further would lower the amount of stored hydrogen even further.

Proper control of the hydrogen level can establish a desired or correct level of precharge. The relationships governing hydrogen pressure versus stored charge are known in the art. For example, pressure-composition-temperature (PCT) diagrams are available for some of the well known metal hydride systems. From these diagrams it can be seen that the hydrogen concentration in the sinter atmosphere does not provide a linear relationship with absorbed hydrogen. Rather, the relationship is semi-logarithmic. This is important because extremely precise control of the hydrogen level is needed. Instruments for monitoring gas flow, such as those used in the semi-conductor industry, are adequate for this purpose. Thus, generally speaking, it is possible to set the desired level of precharge for any material if sufficient processing control is available.

The above-mentioned thermal technique for providing a state of charge setting is a thermodynamic concept. The kinetics of this reaction are variable. Based on the material type, the desired extent of reaction, and oxide conditions prior to sintering, the required time for complete reaction may vary. The concept assumes sufficient time is available for equilibrium, although it is possible to vary the details of processing in such a manner to reduce total processing time. For example, using a quick cooling rate and/or limiting exposure time with a higher hydrogen concentration can accomplish the same desired effect. Additionally, in electrode fabrication processes which do not incorporate a sintering step, such as plastic or cold bonded electrodes, it is possible to apply the same concept to the active material powder prior to adding the bonding material.

Another aspect of the proposed invention for activating negative electrodes for sealed cell applications relates to the surface condition of the metal and techniques to provide the desired surface condition. Even through the use of careful fabrication, it is still possible and likely that a surface oxide will be formed upon exposure to air. This is important to recognize because it is not always practical for the electrode to exist under a protective atmosphere. Since as a practical matter some oxidation during electrode fabrication is unavoidable, the invention provides a method which may be used to overcome the adverse effects of oxide formation by electrode activation. This method includes, prior to placing the negative electrode in a sealed cell, exposing the electrode to an alkaline solution to alter the nature of the oxides. This process, referred to as etching, alters the surface condition of the metal hydride electrode in such a way that excellent charging efficiency is achieved on even the first charge cycle. Although this quality may not be necessary in a prismatic cell, it is an important requirement for a sealed cell, where cell failure due to overpressure is a vital concern.

Though not wishing to be bound by theory, it is believed that the etch processes' major role is surface modification, permitting greater charge acceptance. For the materials specified in U.S. Pat. No. 4,551,400, the oxide layer of an "as fabricated" electrode has a typical thickness ranging from about 50 to 1000 angstroms. The variance has been associated with subtle changes in process conditions. The composition of the as fabricated surface oxide is representative of the material composition. For example, a material of composition $V_{53}Ti_{17}Cr_{16}Ni_{14}$ will have a higher level of vanadium oxide than a material of composition $V_{33}Ti_{17}Zr_{16}Ni_{34}$. These two aspects of the surface condition, oxide thickness and composition, have an important role in effecting the ease of electrode activation.

The role of the surface condition on activation is related to both charging and discharging efficiency. When charging a freshly fabricated electrode, hydrogen can be accepted with metal hydride formation (reaction (1)), or charging can generate molecular hydrogen (reaction (7)). It is believed that reaction (7) is promoted by increasing oxide thickness and by increasing oxide density, although the composition is also important. It is also possible to reduce the likelihood of hydrogen evolution by increasing electrode surface area, which reduces the current density. This being the case, it is possible to promote initial activation by decreasing initial oxidation or by increasing initial surface area. For materials which form extensive new surface area during electrochemical cycling, but are somewhat difficult to activate, it is advantageous to overcome initial oxidation rather than increase initial surface area.

Increasing initial surface area is not preferred for two reasons. First, practically, it is very difficult to increase surface area by further reducing particle size, due to the extreme hardness of many of these alloys. Second, it is virtually impossible to eliminate oxidation during fabrication. Thus, even though the initial surface area is higher, these surfaces are covered with oxide. For materials such as $V_{25}Ti_{17}Zr_{16}Ni_{42}$, it is advantageous to overcome the effect of initial surface oxides, since large surface area increases are inherent during electrochemical cycling. In effect, initial surface oxides inhibit the formation of new surfaces, which can form so extensively that the initial surface area is only a small fraction of the final electrode surface. Surfaces created in this manner have the advantage of being virtually oxide free, since there was no exposure to atmosphere during fabrication. This aspect of the in situ created surfaces has a tremendous beneficial impact on discharge rate capability and on cycle life. It has been determined that oxide formation and the gradual buildup of oxide during cycling increases electrode polarization, thereby diminishing rate capability and decreasing cycle life.

Since it is advantageous to form a high percentage of electrode surface area in situ, and initial surface oxidation can inhibit the formation of new surfaces, a method was required to overcome the effect of initial oxidation. This was accomplished by the etching techniques. It is believed that etching increases charge acceptance through the partial removal of surface oxides. It is believed that oxides which are formed during fabrication are relatively thin, but dense and extremely impermeable to hydrogen diffusion. By removing some of the soluble components of the surface oxide, such as vanadium oxides, it is believed that hydrogen diffusion is promoted, allowing improved electrochemical hydrogen transfer and charge acceptance. It has been determined that oxides of vanadium are readily soluble in potassium hydroxide. It is further believed that during the corrosion of vanadium some of the less soluble oxides like titanium oxide and zirconium oxide can be removed as solid precipitates or as colloidal particles. The surface oxide after etching can be thicker than that of the initial electrode, but by removal of the soluble components is more porous than oxides formed during fabrication. It may also be possible that oxides formed during etching form hydroxide complexes with the metals of the active material, rather than the less permeable oxides. Significant improvements in initial charging efficiency have been obtained as a result of electrode etching, resulting in lower cell pressures.

In addition to promoting charging efficiency, etching assists the discharge reaction (2). It is believed that the surface which results from etching also promotes the ionic diffusion required for the electrochemical discharge process. It is necessary to react hydrogen from the metal with hydroxyl ions from the electrolyte during discharge. It has been observed that extremely thick oxides, which can occur after extended cycling, and dense oxides, which exist from fabrication, tend to inhibit this process. Acting as a resistance, the oxide can polarize the electrode, reducing the rate at which the discharge process can proceed. It is believed that the etching process provides an excellent surface for the discharge process. By removal of the soluble oxide components, the overall permeability of the hydrogen and hydroxyl ions is increased. An additional feature of the etch treatment on oxide modification is also believed to beneficially contribute to enhancing the discharge process. By selectively removing only a portion of the oxide layer, etching has provided catalytic sites of nickel metal, which are resistant to oxidation and very insoluble in potassium hydroxide electrolyte. It is believed that in addition to providing catalytic surfaces for the discharge reaction, the nickel being present in the metallic form provides a conductive element to the surface oxide. In effect, the nickel acts to balance the insulating qualities of oxides such as titanium and zirconium oxide.

An additional aspect of the surface condition provided by etching relates to the gradual nature of the oxide-metal interface. Rather than providing a distinct and clear boundary layer between the metal and the electrolyte, the surface after etching is more accurately described as a gradient of oxidation state. For example, a species like vanadium can be analyzed as $V_2O_5$ close to the electrolyte interface while being found as $VO_2$ closer to the metal. Additionally, the composition of the oxide is nonuniform, more closely resembling the bulk material composition further from the electrolyte interface. Near the electrolyte/oxide interface, the concentration of the soluble components of the oxide is virtually negligible. Thus, the oxide can be characterized as a gradient of composition and oxidation state, having an electrical and catalytic nature suitable for the electrochemical charge and discharge process.

The conditions of etching are temperature and time dependent. Some corrosion of materials such as $V_{33}Ti_{17}Zr_{16}Ni_{34}$ occurs naturally, even at room temperature exposure. Cells in which electrodes were soaked for several days in an alkaline media have shown very low pressures. Elevated temperatures, such as about 50° C., may be used to accelerate the process.

The actual conditions used in etching are related to the material composition and the care with which the electrode was fabricated. The material composition is important because some metal oxide components, such as vanadium oxides, are much more soluble in an alkaline environment than others. Fabrication quality is important because the etch process can be thought of as dissolving or removal of initial oxidation. Obviously, if a greater degree of initial metal oxide exists, a more aggressive etching condition would be needed. Generally, this can mean a higher temperature and/or a longer time of exposure to the alkaline material. However, it should be noted that time and temperature are interdependent. The actual conditions chosen for etching are based on practical considerations and in many cases the etching process can be done at ambient temperature.

Though not wishing to be bound by theory, it is believed that in addition to a partial removal of surface oxides, the etch process may also alter the oxide in a manner that permits greater charge acceptance. It is believed that the oxides which are formed on exposure to atmosphere are relatively thin, but of high oxidation state and extremely impermeable to hydrogen diffusion. By corroding any soluble components from the surface, it is believed that the altered surface oxide state more readily allows electrochemical hydrogen transfer and charge acceptance. It has been determined that the oxides of vanadium are readily soluble in potassium hydroxide. It is further believed that during the corrosion of vanadium some of the less soluble oxides like titanium oxide and zirconium oxide can be removed as solid precipitates or as colloidal particles. The surface oxide after etching can be thicker than that of the initial electrode, but by removal of the soluble components is more porous than oxides formed during fabrication. The techniques used to analyze the etched surface are complicated, and it may be in some cases that the oxide is virtually eliminated during etching. Furthermore, it may be possible that any oxidation which occurs during etching forms hydroxide complexes with the metals of the active material, rather than the less permeable oxides which can form upon exposure to air during electrode fabrication. Significant advances in initial charging efficiency as a result of etching have been obtained. Generally, cells in which etched electrodes have been used have shown much lower pressure than cells with unetched electrodes. Another major benefit of the etch process is in eliminating variability among electrodes where subtle changes in electrode fabrication can have significant effects on cell pressure.

Suitable alkaline materials include, for example, potassium hydroxide, sodium hydroxide and mixtures thereof. The alkaline material can be present in any suitable form, such as in an aqueous solution or a slurry.

In another aspect of the invention, the activation of the negative electrode is performed using an electrochemical method that is a modification of the etching process, referred to as constant potential etching. The negative electrode potential is deliberately pushed to values anodic to its open circuit value in an alkaline medium. This can be achieved either with an electronic potentiostat or by a manual discharge via a resistor. For example, when the negative electrode is held at $-0.55$ V versus a Hg/HgO/OH$^-$ reference electrode, the surface oxides either dissolve or are converted to higher oxidation states which facilitate dissolution. Also, at these anodic potentials one or more of the corrodible components of the matrix alloy dissolves, taking with it other species of oxides. This cleanses the surface and thus activates it. A further advantage of this technique arises from the fact that the state of charge of the negative is preset by the applied potential. Since the applied potential is anodic to the open circuit value, the electrode begins to discharge. The difference between this type of discharge and the usual discharge is that this discharge is a constant potential discharge while traditionally it is a constant current discharge. The current is high to begin with, but soon decays almost exponentially to low values dictated by the corrosion of the underlying substrate. Once the current has reached a low steady state value, it signifies the low state of charge has been achieved. Thus, this technique achieves surface activation and sets low state of charge simultaneously.

The time for which the electrode is held at the anodic value is critical and may vary from material to material. Excessive holding times could passivate the negative surface, thus deactivating it once again. Typically, a standard negative electrode was kept at $-0.55$ V vs. Hg/HgO/OH$^-$ for about 5 to 30 minutes, and then it was made into a cell. Cells made like this showed low pressures and extremely fast activation.

The conditions of constant potential etching are variable. In addition to changing the etch time to compensate for electrode conditions, the potential can also be varied. Generally, the more positive the potential, the greater the dissolution rate of the corrodible species. As such, the actual voltage chosen is dependent on the active material composition and the electrode surface condition. For the materials specified in U.S. Pat. No. 4,551,000, it has been determined that a potential of about $-0.55$ V vs. Hg/HgO/OH$^-$ is suitable. The time would be varied to compensate for specific compositions and fabrication conditions. For materials with less soluble components than those specified here, a more aggressive oxidizing potential might be chosen. The scope of the invention contemplates a method of accelerating oxide dissolution through the manipulation of the voltage-time relationship.

Another aspect of the invention combines certain previously described aspects of the first two inventions. This method, referred to as predischarging, involves etching an electrode to modify the surface followed by discharging the electrode to set the initial state of charge and provides a resulting electrode. The resulting electrode is then ready for use in a sealed cell. This technique is utilized on an electrode where it is more practical to add excess precharge to a metal hydride electrode during electrode fabrication. As described earlier, this can be accomplished by sintering in an atmosphere featuring a relatively high level of hydrogen. Achieving a desired level of hydrogen can be more consistently attained by utilizing this approach if sufficient hydrogen level control is not available or if insufficient knowledge of the hydrogen absorption kinetics is available. Thus, after electrode fabrication, it becomes necessary to remove the excess hydrogen to correspond to the electrochemical reference point. Attempts to electrochemically discharge the excess hydrogen directly are hindered by metal oxides which can form after the sintering step upon exposure to air. Utilizing the etch process prior to electrochemical discharge allows the discharge step to proceed more easily. In effect, in addition to hindering initial charging efficiency, the surface oxides can also impair the electrochemical discharge, or hydrogen oxidation process. Once an electrode containing excess hydrogen has been etched, and discharging the electrode to a voltage of about $-0.7$ volts vs. Hg/HgO/OH$^-$ at a discharge rate of about 5-25 milliamps per gram is accomplished, the electrode surface condition and state of charge is appropriate for application into a sealed cell.

Another method of activating a metal hydride electrode for use in a sealed cell, referred to as preformation, also involves giving the negative electrode one or more electrochemical charge-discharge cycles prior to placement in a sealed cell. It has been determined that in addition to setting the state of charge and overcoming the effect of initial surface oxides, preformation greatly increases the active material surface area. This, in turn, has the effect of lowering the current density of a given electrode at a specified charging current.

The initial surface area of the electrode is related to the particle size distribution of the active material powder, the electrode density, and the degree of interparticle bonding which occurs during sintering. However, for many of the active material compositions disclosed in U.S. Pat. No. 4,551,400, and materials covered in the prior art, the initial surface area is only a small fraction of the final surface area which occurs after electrochemical cycling. The degree of surface area increase which occurs is related to many factors such as the number of cycles, depth of discharge, initial surface condition, and active material composition. The surface area increase comes about due to the expansion and contraction of the metal lattice during the charge and discharge cycles. Many of the materials suitable for electrochemical applications are very hard and brittle. Thus, the expansion and contraction of the metal during cycling forms cracks which can form so extensively that the new surfaces formed upon cycling far exceed those formed under initial fabrication.

It has been determined that maximizing the surface area prior to using the electrode in a sealed cell is advantageous from a pressure standpoint. As previously mentioned, a sealed cell contains excess negative electrode to minimize hydrogen evolution. Thus, in a standard positive limited cell, the negative is not fully utilized. Another way of stating this is the degree of charge/discharge (depth of discharge) for the negative electrode is not 100% in a cell. Because of this, the cell must be cycled many more times for the negative surface area to reach the same level than if the negative were to be 100% utilized. This situation is undesirable in a sealed cell, as pressure problems are most acute during the initial stages of cycling.

The preformation technique includes subjecting the negative electrode to at least one electrochemical cycle prior to being placed in a sealed cell. The preformation can be done in a flooded, prismatic cell with enough counter electrode capacity available to utilize the negative electrode capacity 100%. The preformation first involves charging the electrode at a suitable rate such as, for example, about 50 milliamps per gram of active material to a total charge input in excess of the negative capacity and preferably about 150% of the negative capacity. The electrode is then discharged at a rate of about 5 to 25 milliamps per gram to a cutout voltage of about $-0.7$ vs. a Hg/HgO/OH$^-$ reference electrode. At this point excess electrolyte is removed and the electrode can be placed in a sealed cell.

Several variations of this process can be made. For example, prior to the initial charge, the etch process can be used. Also, more than one preformation cycle can be used. For each, the purpose is to assist in the electrode activation. A parameter for consideration is the amount of ultimate capacity that the electrode reaches after one cycle. For example, for a material with an ultimate capacity of 300 milliamp-hours per gram, if a value of about 240 milliamp-hour per gram or more is not achieved after one preformation cycle, usually the electrode is subjected to an additional charge/discharge cycle. As a general rule, preformation is sufficient when a value of about 80% of an electrode's ultimate capacity has been achieved. As a practical matter, an acceptable amount of ultimate capacity relates to the material composition and the quality of electrode fabrication, since some compositions may be more easily prone to oxidize and/or cause production of molecular hydrogen during charging or overcharging.

Preformation is a preferred embodiment of the invention. It has been determined that a consistent precharge level is achieved and that surface area is maximized by preformation. For example, from an initial roughness factor of about 100, electrodes using only 1 preformation cycle have achieved a surface roughness of about 1500, and usually a surface area increase of about 10 times or more for the $Ti_{2-x}Zr_xV_{4-z}Ni_z$ alloys previously referred to. As used herein, the roughness factor is the total surface area as measured by BET technique divided by the geometric surface area. Cells using electrodes of this type have shown stable pressures of less than 25 psi, excellent rate behavior, and exceptional reproducibility.

Preferably, the initial charge cycle has an input of about 100% of the electrode charging capacity. While a beneficial effect is obtained from a lower charge input, best results are generally obtained when the electrode is fully charged.

Figure 2:
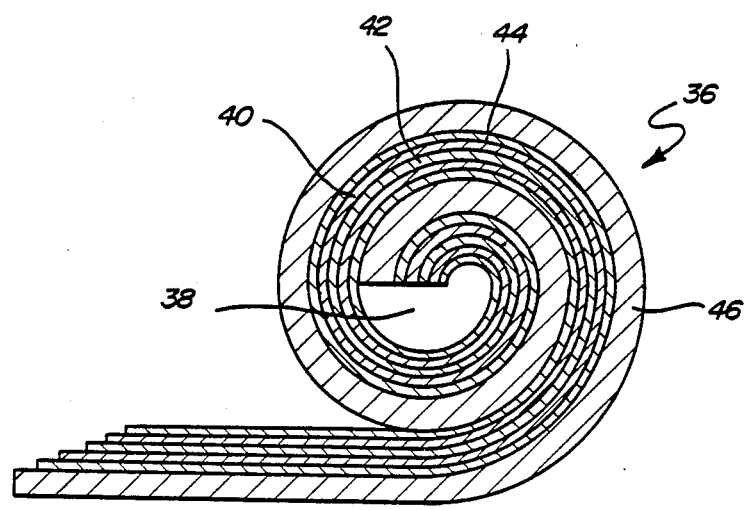
FIG. 2 is a sectional side view of a jelly-roll electrochemical cell having a negative electrode in accordance with the invention.

The methods and negative electrodes in accordance with the invention can be used in many types of hydrogen storage cells and batteries. Referring now to FIGS. 1 and 2, various electrochemical cell embodiments utilizing the negative electrode of the invention are set forth. In FIG. 1, a flat cell 10 is illustrated that includes a substantially flat plate negative electrode 12 in accordance with the invention. Electrode 12 includes a current collector 14 that is in electrical contact with the active material of electrode 12 and a tab 16. Collector 14 and tab 16 may be made of suitably conductive metals such as nickel. Flat cell 10 includes a positive electrode or counterelectrode 18 which is substantially flat and aligned to be in operative contact with negative electrode 12. A separator 20 is disposed between counterelectrode 18 and negative electrode 12.

A second negative electrode 22 may be spaced in operative contact with the counterelectrode 18 on the side of counterelectrode 18 opposite negative electrode 12. Negative electrode 22 is similar to electrode 12 and includes a current collector 24 which is in electrical contact with the active material of electrode 22 and tab 26. A second separator 28 is disposed between negative electrode 22 and the counterelectrode 18.

Cell 10 depicted in FIG. 1 may be sealed in a suitable material, such as a plastic container 30, which does not deteriorate in contact with the electrolyte used and allows venting of cell 10 should it gas beyond a predetermined limit during operation. A 30 weight percent aqueous solution of potassium hydroxide is a preferred electrolyte. First and second tabs 16 and 25, 26 are electrically connected to a first set of leads 32 that extends outside of the cell plastic 30. Likewise, a second lead 34 electrically connects to counterelectrode 18 and extends outside of plastic container 30.

FIG. 2 illustrates a commercially preferred jelly-roll cell 36 that is made by spirally winding a flat cell about an axis 38. Jelly-roll cell 36 includes an electrical contact tab 40, a negative electrode 42, separator 44 and a positive electrode 46. Jelly-roll cell 36 may be placed in a can or other suitable container (not shown) that contacts tab 40 connected to negative electrode 42, activated in accordance with the invention. Separator 44 is positioned between negative electrode 42 and positive electrode 46.

Figure 3:
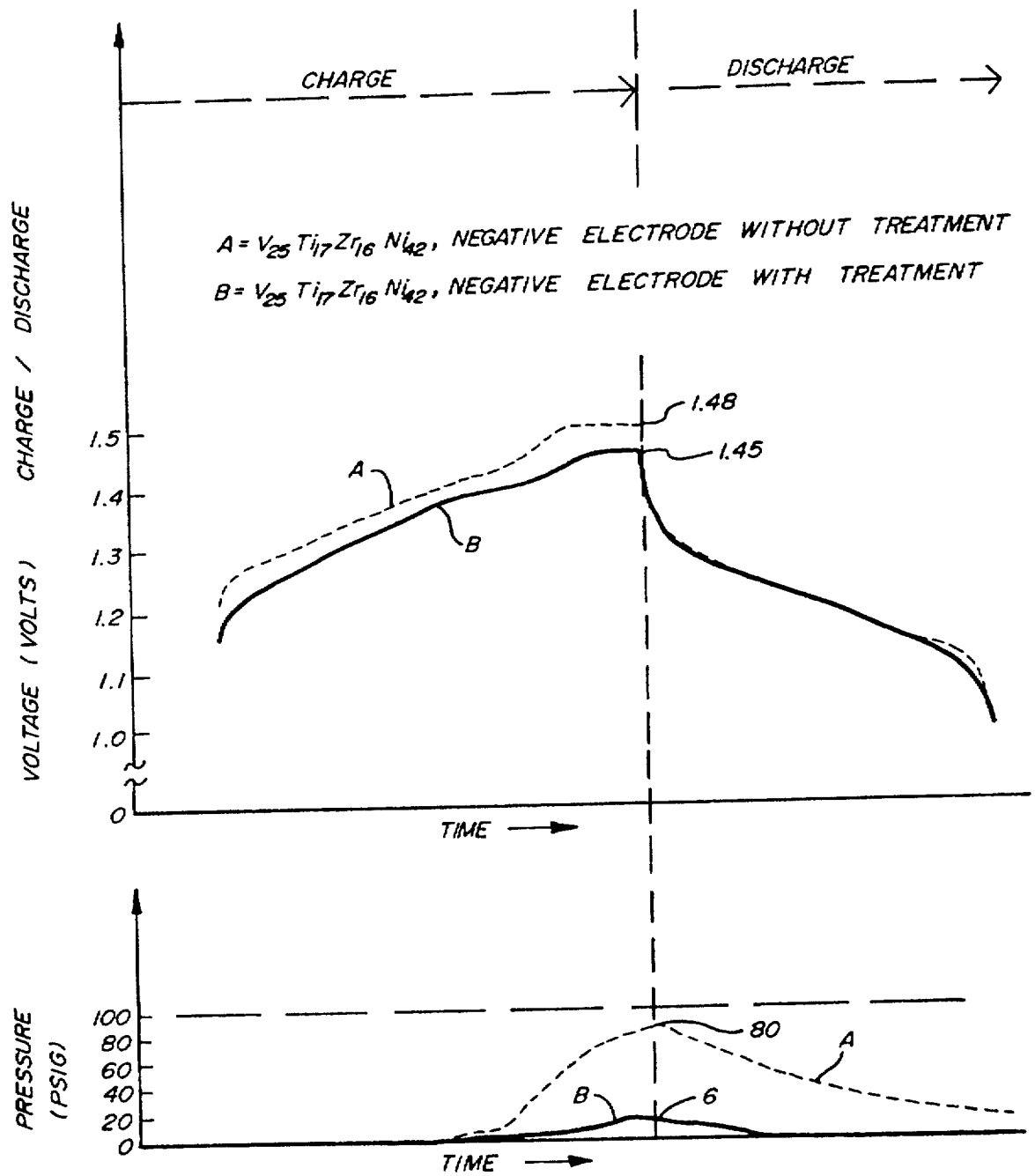
FIG. 3 is a graph illustrating a comparison of charge and discharge voltage and pressure characteristics for two electrochemical cells, one having a negative electrode without preformation and the other having a negative electrode with preformation in accordance with the invention.
Figure 6:
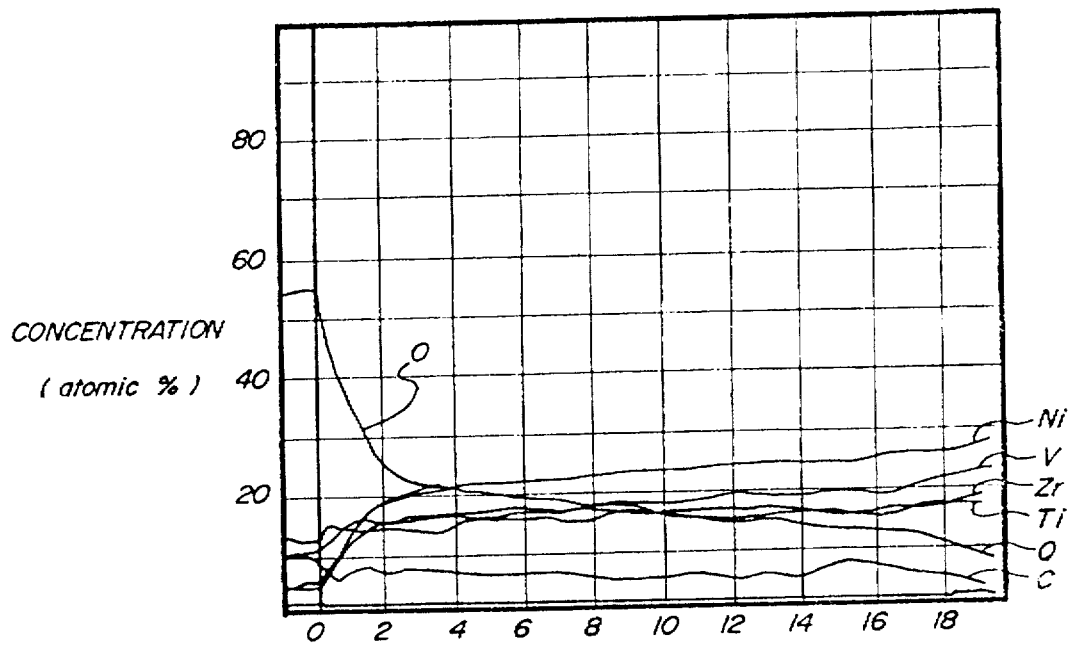

Referring generally to FIGS. 3 and 4, there are illustrated charge and discharge voltage and pressure characteristics for different electrochemical cells, including those having activated negative electrodes in accordance with the invention and those with unactivated negative electrodes.

EXAMPLE I

Two sealed electrochemical cells were made and tested for voltage and pressure during charge and discharge as a function of time. Cell B had a preformed negative electrode activated in accordance with the invention and Cell A had an unactivated negative electrode. Each cell comprised a nickel hydroxide electrode, a negative electrode and 30 weight percent KOH electrolyte. The active material composition for each negative electrode was $V_{25}Ti_{17}Zr_{16}Ni_{42}$ and contained 7% by weight of nickel binder, pressed into a nickel screen mesh current collector and sintered in an argon/hydrogen atmosphere.

The negative electrode of Cell B was treated or activated by a preformation method in accordance with the invention by charging for 10 hours in 30 weight percent KOH electrolyte solution at 400 mA and discharged at 300 mA to a $-0.7$ volt cutoff versus a Hg/HgO/OH$^-$ reference electrode. Excess electrolyte was then removed, and the electrode was placed in a cell for testing.

The charge and discharge performance of Cells A and B is illustrated in FIG. 3.

The pressure of Cell A increased during charging and overcharging, reaching a maximum of about 80 psig and requiring a charging voltage of 1.48 volts.

The pressure of Cell B, having a preformed negative electrode in accordance with the invention, had no appreciable increase in pressure during charging and increased during overcharging to only about 15 psig. A charging voltage of 1.44 volts was required, which was significantly lower than for Cell A. In addition, the activation process and activated electrode, while lowering the required charging voltage, did not lower the discharge voltage. Thus, the decrease in cell pressure is mainly due to the activated negative electrode.

In FIG. 4, the pressure behavior of Cell B as a function of cell cycling is plotted. As the plot indicates, the pressure behavior as a function of the number of charge and discharge cycles is very stable.

EXAMPLE II

Cells were made in accordance with the invention by rolling the negative electrode with a suitable nickel hydroxide positive electrode and separator, inserting them into an open container, flooding with electrolyte and charging and discharging the open cell for seven cycles. Each cycle comprised charging for nine hours at 300 mA and discharging at 300 mA to a 1.0 volt cutoff. After the seventh cycle, the excess electrolyte was blotted and the cells were sealed. About ten sealed cells were produced in this way. The cells in this Example were prepared using negative electrodes with an active material of composition $V_{33}Ti_{17}Zr_{16}Ni_{34}$.

These cells had overcharge pressures of about 75 psig while identical cells with no treatment had pressures of about 300 psig.

EXAMPLE III

A sealed electrochemical cell in accordance with the invention was made and tested for voltage and pressure during charge and discharge as a function of time. The cell had a preformed negative electrode activated in accordance with the invention. The cell comprises a nickel hydroxide electrode, a negative electrode and 30 weight percent KOH electrolyte. The active material composition for the negative electrode was $V_{33}Ti_{17}Zr_{16}Ni_{34}$ and contained 7% by weight of a nickel binder, pressed into a nickel screen mesh current collector and sintered in an argon/hydrogen atmosphere. The negative electrode was preformed or activated by a method in accordance with the invention by subjecting the negative electrode to four charge and discharge cycles (500 mA charge for 9 hours, 300 mA discharge to a $-0.7$ volt cutoff versus a Hg/HgO/OH$^-$ reference electrode), in a flat, flooded container using two nickel hydroxide positive electrodes of substantially higher capacity than the negative electrode. The last cycle was ended in a discharge direction to assure removal of the excess charge from the negative electrode before rolling it into the cell. After the activation cycles, the excess electrolyte was removed from the electrodes.

This cell exhibited a maximum pressure of about 30 psig during overcharging. Cells prepared with electrodes having no pretreatment can have pressures as high as 300 psig during overcharging.

EXAMPLE IV

A large number of sealed hydrogen storage electrochemical cells were prepared in accordance with the invention by etching the negative electrode. The active material composition for the negative electrode was $V_{25}Ti_{17}Zr_{17}Ni_{42}$ and contained 7% by weight of a nickel binder, pressed into a nickel screen mesh current collector and sintered in an argon/hydrogen atmosphere. The negative electrodes were etched by placing the electrodes in an alkaline medium composed of 30% potassium hydroxide in water. The temperature of the alkaline was 50° C., and the electrodes were exposed for 1 hour. The electrodes were then transferred to 30% KOH at 25° C., excess electrolyte was wiped off, and the electrodes were placed in a sealed cell with a nickel hydroxide positive electrode.

Forty-two sealed cells were prepared in this manner, with an average steady state overcharge pressure of 70 psig after overcharging at 300 mA. Seven cells not etched, but otherwise identical, had an average steady state pressure of 160 psig after the same level of overcharging.

EXAMPLE V

Two sealed hydrogen storage electrochemical cells were prepared in accordance with the invention by etching the negative electrodes as in Example IV and one negative electrode was further treated by predischarging. The negative electrode active material had a composition of $V_{33}Ti_{17}Zr_{16}Ni_{34}$, contained 7% nickel binder by weight, and was compacted onto a nickel screen mesh current collector. The electrodes were sintered at a temperature of 950° C. for 5 minutes in an atmosphere of 4% hydrogen in argon, measured on a volumetric basis.

Both negative electrodes were etched as described in Example IV. One negative electrode then had excess electrolyte removed and was placed in a sealed electrochemical cell. The other negative electrode was further treated, according to another aspect of the invention, by predischarging. The electrode was placed in a flat electrochemical cell which was open to the atmosphere, had a nickel hydroxide positive electrode, a Hg/HgO/OH$^-$ reference electrode, and excess electrolyte.

The predischarged negative electrode was initially discharged at a rate of 25 mA/gram active material to a cutoff voltage of $-0.7$ V versus a Hg/HgO/OH$^-$ reference electrode. The removed capacity was 45 mAh/gram active material. The electrode was then discharged further at a rate of 12 mA/gram to the $-0.7$ V cutout, where additional capacity of 42 mAh/gram was removed. The electrode was then discharged further at a rate of 5 mA/gram to the $-0.7$ V cutout, where additional capacity of 53 mAh/gram was removed. The electrode was then wiped to remove excess electrolyte and was placed in a sealed electrochemical cell.

The cell where the negative electrode was etched had a pressure of 300 psig. The cell where the negative electrode was etched and then was predischarged had only a pressure of 6 psig.

EXAMPLE VI

Two negative electrodes for use in hydrogen storage electrochemical cells were fabricated and one was treated in accordance with the invention by constant potential etching. The negative electrode active material had a composition of $V_{33}Ti_{17}Zr_{16}Ni_{34}$, contained 7% nickel binder by weight, and was compacted onto a nickel screen mesh current collector. The electrodes were sintered at a temperature of 950° C. for a period of 5 minutes under an atmosphere of 4% hydrogen in argon by volume.

One electrode was then constant potential etched according to the invention. The electrode was placed in a flat electrochemical cell which contained a nickel hydroxide positive electrode and excess electrolyte. Using an ECO model 549 potentiostat, the negative electrode was held at a potential of −0.55 volts versus a Hg/HgO/OH⁻ reference electrode for a period of 10 minutes.

Both electrodes active were tested for electrochemical capacity of by being placed in a flat electrochemical cell, which contained a nickel hydroxide positive electrode of excess capacity. The cell was prismatic, and contained excess electrolyte. (30% potassium hydroxide by weight). Both electrodes were charged at a current of 50 mA/gram of active material to a time providing 150% charge input. The electrodes were then discharged at a rate of 25 mA/gram active material, with capacities measured to a cutoff voltage of −0.7 V versus a Hg/HgO/OH⁻ reference electrode. Where the untreated electrode had a first cycle capacity of 120 mAh/gram, the electrode which was constant potential etched had a capacity of 240 mAh/gram.

EXAMPLE VII

Negative electrodes for use in sealed hydrogen storage electrochemical cells were fabricated. Electrodes having an active material composition of $V_{25}Ti_{17}Zr_{1.6}Ni_{34}$ were mixed with 7% nickel binder by weight, and compacted onto a nickel screen mesh current collector. The electrodes were sintered at a temperature of 950° C. for 5 minutes. However, according to the invention, the electrode state of charge was controlled by providing a desired concentration of hydrogen in the sintering atmosphere. Thus, electrodes were sintered in 0.5%, 1%, 2%, and 4% hydrogen, measured on a volumetric basis, with the balance being argon.

With no other treatment after sintering, the electrodes were placed in a sealed electrochemical cell with a nickel hydroxide positive electrode and 30% potassium hydroxide electrolyte. The cell was then electrochemically charged and discharged, and cell pressures were measured as follows:

| Hydrogen Concentration | Cell Pressure | Weight % H in negative electrode as H/M, where M is active material of negative electrode |
|---|---|---|
| 0.5% | 250 psig | 0.17 |
| 1.0% | 350 psig | 0.22 |
| 2.0% | 400 psig | — |
| 4.0% | 430 psig | 0.44 |

EXAMPLE VIII

The present invention beneficially alters the negative electrode surface area. After various treatment methods in accordance with the invention have been used on negative electrodes as hereinafter described, the electrodes were rinsed in distilled water to remove the potassium hydroxide. The electrode is then dried at 60° C. for a period of about 24 hours in an argon environment. About 1 to 2 grams of the dried electrode is used for surface area measurement.

Surface area was determined by the well known gas absorption surface area measurement (BET) technique. The electrode segment was placed in a bulk sample cell and outgassed under a nitrogen purge at a temperature of 250° to 300° C. The sample cell is then immersed in liquid nitrogen under an atmosphere of 0.3 mole fraction nitrogen in balance helium. The amount of nitrogen absorbed is proportional to the sample surface area and is measured using a Model QS-9 Quantasorb surface area analyzer manufactured by Quantachrome.

BET surface areas were measured for electrodes treated under the various aspects of the invention. The electrodes $V_{25}Ti_{17}Zr_{1.7}Ni_{42}$, containing 7% nickel binder by weight, compacted onto a nickel screen mesh current collector, and sintered at a temperature of 950° C. for a period of 5 minutes under an atmosphere of 4% hydrogen in argon. BET surface areas are expressed as area in square meters per gram of active material and are alternately expressed as a roughness factor. The roughness factor is dimensionless, and is the total sample surface area divided by the outside or geometric surface area.

| Description | Roughness Factor | Surface Area (m²/g) |
|---|---|---|
| 1. As fabricated Electrode | 92 | .115 |
| 2. Etched Electrode (as in Example IV) | 200 | .253 |
| 3. Preformed Electrode (as in Example I) (1 cycle) | 666 | .850 |
| 4. Preformed Electrode (as in Example I) (2 cycles) | 1683 | 1.796 |
| 5. Preformed Electrode (as in Example I) (4 cycles) | 1961 | 1.998 |
| 6. Sealed, starved cell* | 2607 | 3.429 |

*(etched as in 2., negative electrode placed in jelly-roll configuration cell with nickel hydroxide positive electrode, 30% KOH added to produce sealed, starved cell which was then cycled 36 times with 300 mA charge for 10 hours followed by a full discharge at 300 mA to a one volt cutoff, after which the cell was disassembled)

EXAMPLE IX

Figure 5:
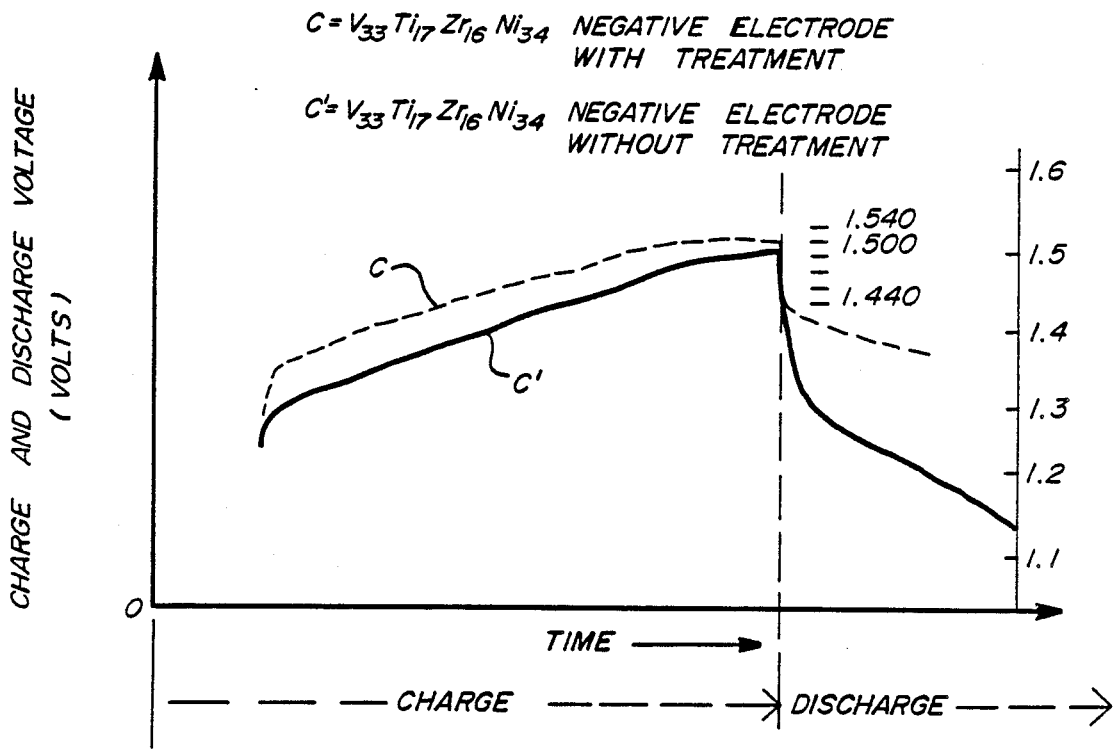
FIG. 5 illustrates the removal of a portion of an electrode for analysis in connection with Example IX.

The example illustrates how the present invention can alter the condition of the surface oxide of hydrogen storage negative electrodes. Each electrode sample was obtained by placing the electrode in an argon glove box. The electrode was rinsed in distilled water to remove residual potassium hydroxide and dried at 60° C. for a period of about 24 hours to remove water contained within the electrode. A segment measuring approximately 1 square centimeter was then removed for oxide analysis, as shown in FIG. 5.

Without atmospheric exposure, the electrode specimen was transferred through an introduction chamber/interlock system to the analytical chamber of a Perkin Elmer Model 550 ESCA/SAM analytical system which has a background pressure of $1.0 \times 10^{-6}$ Torr. The oxide was then analyzed for composition and thickness using Auger Electron Spectroscopy (AES), and for chemical bonding information using Electron Spectroscopy for Chemical Analysis (ESCA).

In AES, the chemical survey occurred over a 10 micron diameter spot using a 3 KV electron beam. Analysis was done in the derivative mode using a lock-in amplifier with a peak-to-peak modulation of about 3 volts. Depth profiling to determine oxide thickness was done in parallel, using 4 KV argon ions with a raster size of 2 mm × 2 mm.

In ESCA, chemical analysis was obtained using aluminum Kα X-rays. Resultant photoelectrons were analyzed in the retarding mode with a pass energy of about 15 to 25 ev. Incident X-rays covered a specimen area of about 1 square centimeter while the analyzed area is about 0.5 square centimeters.

Figure 6:
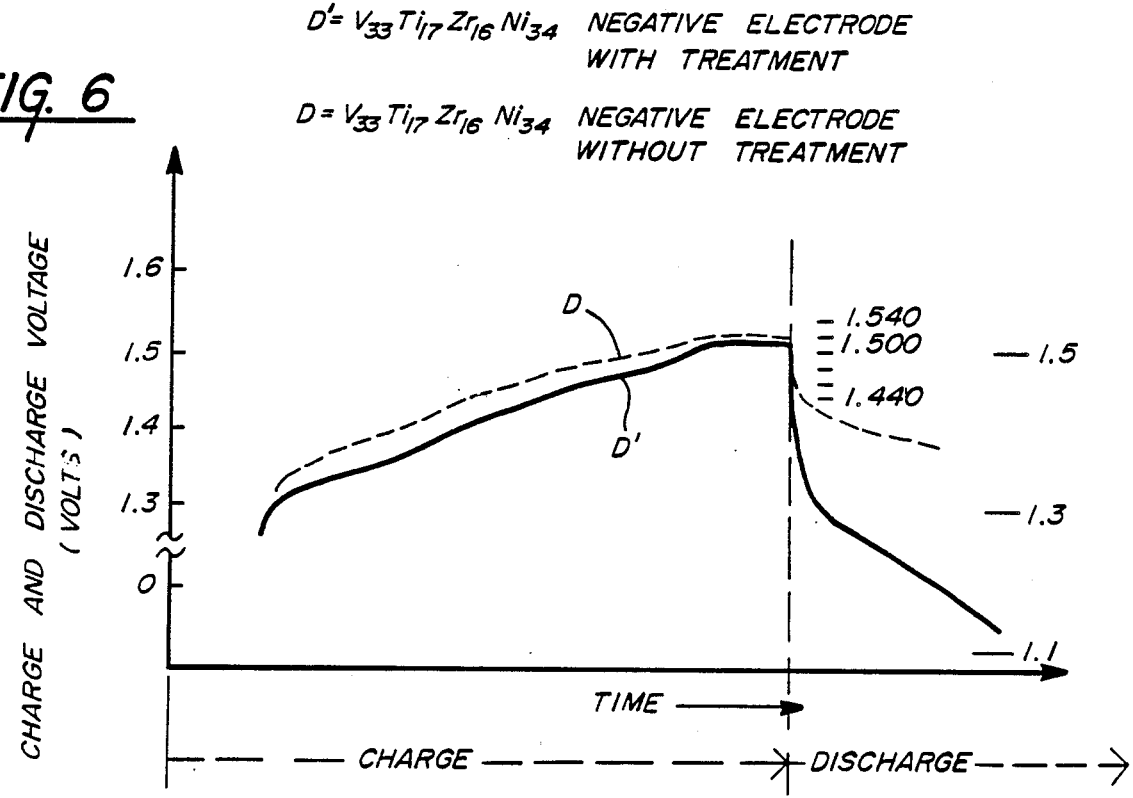
FIG. 6 illustrates an AES profile for an as fabricated negative electrode in connection with Example IX.
Figure 7:
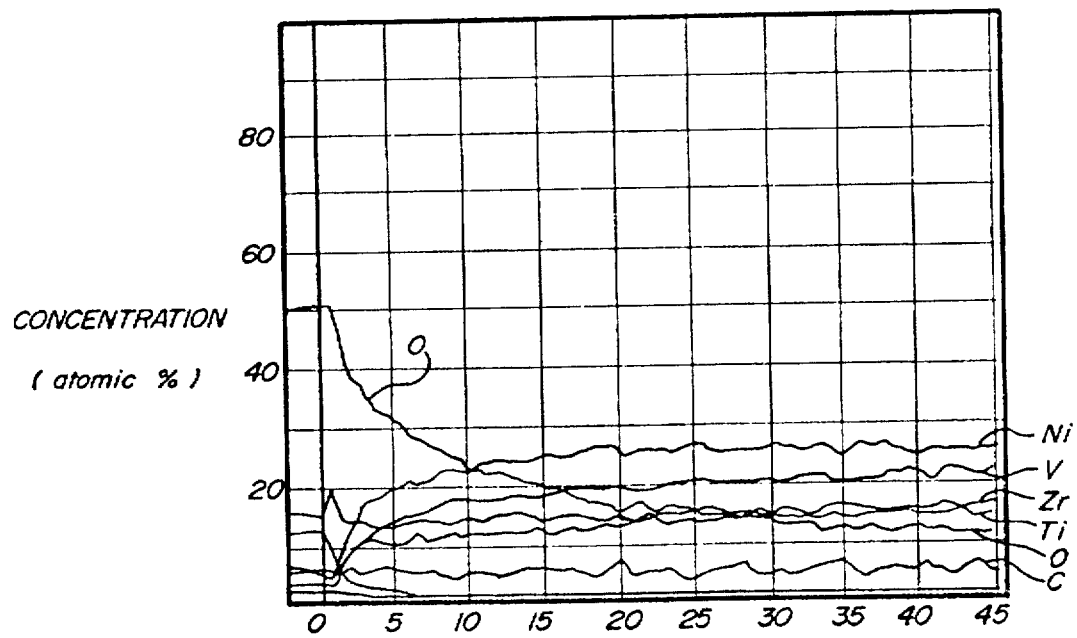
FIG. 7 illustrates an AES profile for an etched negative electrode in connection with Example IX.

FIGS. 6 and 7 represent AES depth profiles for an as fabricated and an etched electrode, respectively. The ordinate is concentration in atomic percent. The abcissa is labeled in sputter time. For both profiles the sputter rate was 41.6 angstroms per minute with respect to a tantalum oxide calibration standard. Thus, the sputter time is also a scale of oxide thickness. In FIG. 6, the oxygen concentration falls to a level of 50% of original in about 1.8 minutes, for an oxide thickness of about 75 angstroms. In FIG. 7, the etched electrode, the oxygen concentration reaches the 50% level after about 8 minutes, for an oxide thickness of about 330 angstroms. These numbers are not intended to represent absolute values of oxide thickness. The oxide/metal interface is not sharp and preferential sputtering can occur. Thus, the term oxide thickness is subjective. However, the profiles clearly demonstrate the relative difference in oxide thickness between an etched electrode and its as fabricated counterpart.

Figure 10:
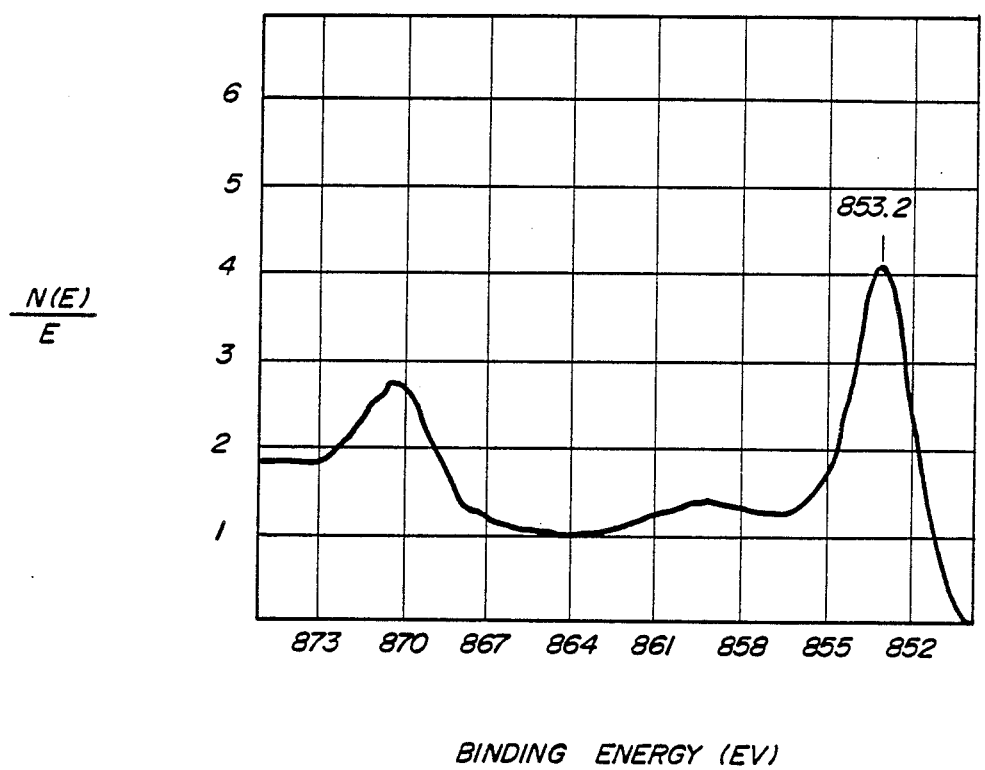
FIG. 10 illustrates an ESCA survey for nickel for the electrode of FIG. 8.
Figure 1:
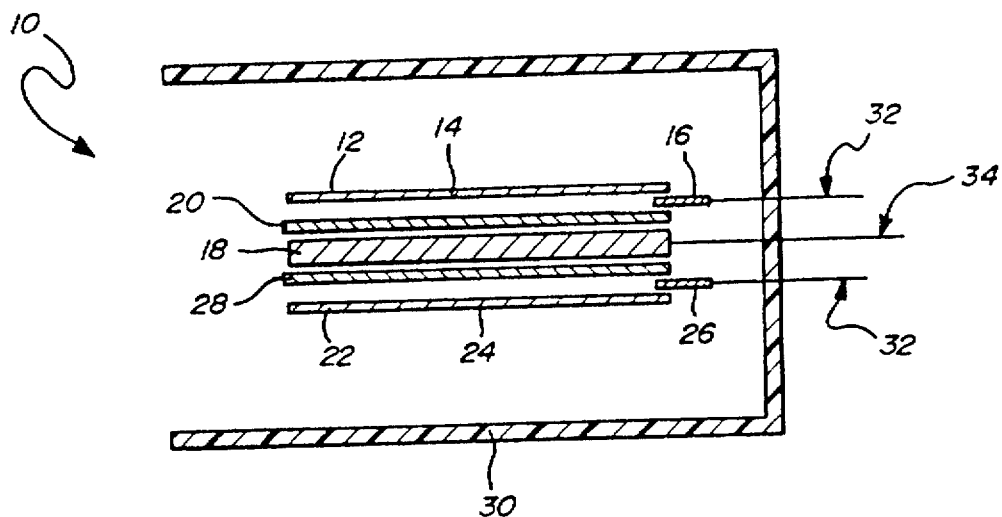
Figure 2:
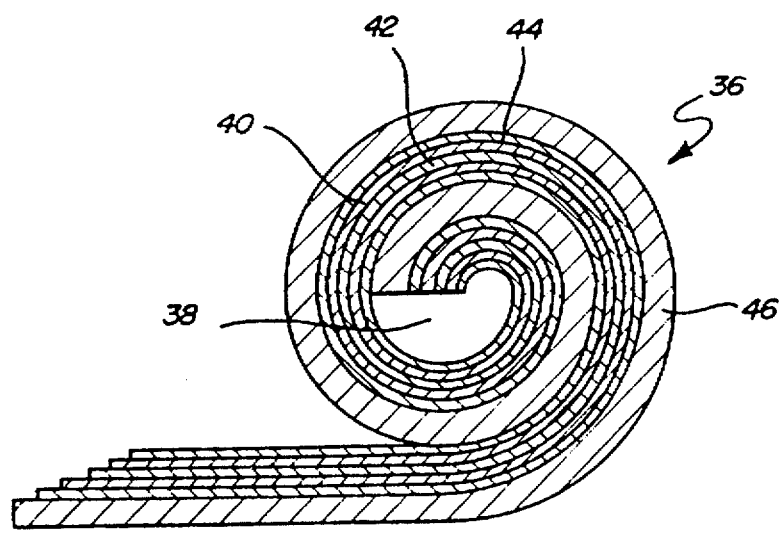
Figure 8:
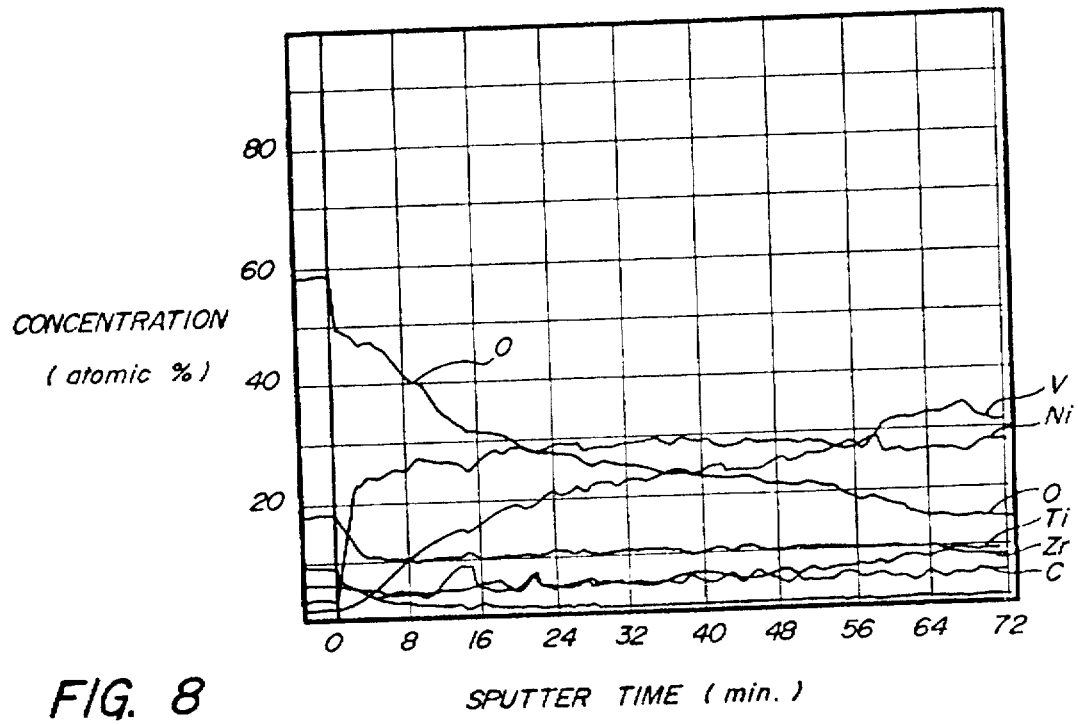
FIG. 8 illustrates an AES profile of an electrode cycled to 9 times in a sealed cell in connection with Example IX.
Figure 9:
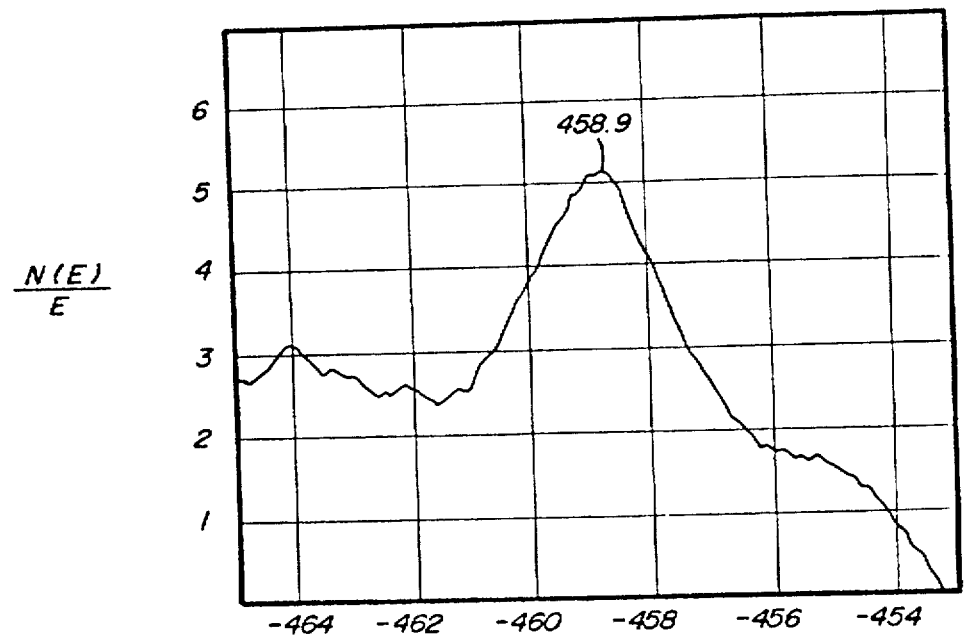
FIG. 9 illustrates an ESCA survey for titanium for the electrode of FIG. 8.
Figure 10:
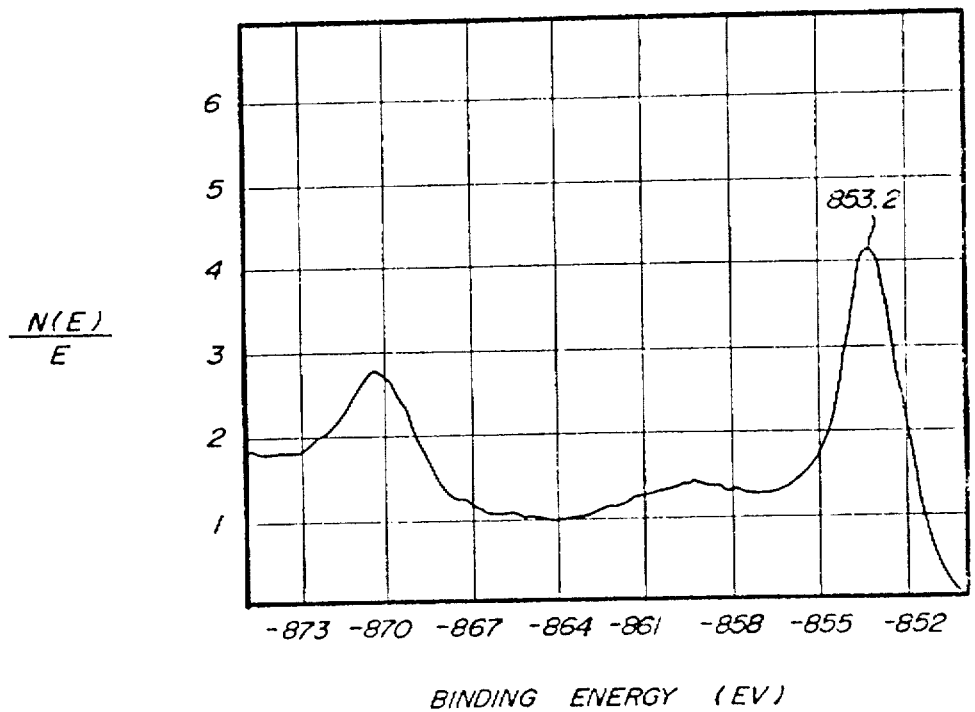

FIGS. 8, 9, and 10 present the surface analysis of a negative electrode taken from a cell which had been cycled 69 times. FIG. 8 presents the AES profile for this electrode. It can be seen that the oxygen concentration falls to the 50% level after about 18 minutes, for an oxide thickness of about 750 angstroms (using a sputter rate of 41.6 angstroms per minute versus a tantalum oxide standard). ESCA surveys were carried out at depth of 500 angstroms into the oxide. FIG. 9 presents the ESCA survey for titanium while FIG. 10 presents the ESCA survey for nickel. The ordinate is the number of analyzed photoelectrons divided by the binding energy while the abcissa is the binding energy. In FIG. 9, a peak binding energy of 458.9 EV corresponds to TiO. In FIG. 10, a peak binding energy of 853.2 EV corresponds to metallic nickel.

EXAMPLE X

In this example, a hydrogen storage negative electrode was treated by constant potential etching. Negative electrodes were prepared under the standard conditions stated in Example IV. The electrodes had an active material composition of $V_{33}Ti_{17}Zr_{16}Ni_{34}$. Electrode segments containing about 1.5 grams of active material were placed in a container with a positive electrode and 100 ml of electrolyte containing 30% KOH in water, measured in weight percent.

One electrode segment was held at a potential of $-0.55$ volts versus a $Hg/HgO/OH^-$ reference electrode. After periods of 5 minutes, 30 minutes, and 24 hours, samples of the electrolyte were withdrawn to be analyzed. For comparison, similar electrolyte samples were withdrawn from an electrode where no potential was applied.

The corrosion of vanadium from the electrode was made by analyzing the electrolyte samples for vanadium using an atomic absorption spectrophotometer. The instrument was a model number 2380 spectrophotometer, manufactured by Perkin-Elmer. The values presented in the table for the two electrodes were compared to calibration standards of known vanadium concentration using a vanadium lamp and a nitrous oxide/acetylene flame.

|  | Electrode A | Electrode B |
| --- | --- | --- |
| baseline (0 minutes) | 0 ppm | 0 ppm |
| 5 minutes | 10.9 ppm | 0 ppm |
| 30 minutes | 18.5 ppm | 9.6 ppm |
| 24 hours | 1054 ppm | 10.2 ppm |

Electrode A - held at a potential of $-0.55$ volts versus a $Hg/HgO/OH^-$ reference
Electrode B - no potential applied All values for vanadium level are given in parts per million (ppm).

EXAMPLE XI

This example illustrates the removal of at least a portion of the surface oxide through constant potential etching in accordance with the invention and the effect of temperature. Negative electrodes were prepared under the standard conditions stated in Example IV with active material of composition $V_{33}Ti_{17}Zr_{16}Ni_{34}$. Electrode segments containing about 1.5 grams of active material were placed in a container with 100 milliliters of 30% potassium hydroxide in water, measured in weight percent.

One electrode segment was held at a temperature of 50° C. and the other was held at 25° C. After periods of 5 minutes, 30 minutes, 120 minutes, and 24 hours, samples of the electrolyte were withdrawn to be analyzed.

The corrosion of vanadium from the electrode was measured by analyzing the electrolyte samples for vanadium using the same technique as specified in Example X. The results of this test were:

|  | Electrode A | Electrode B |
| --- | --- | --- |
| 0 minutes | 0 ppm | 0 ppm |
| 5 minutes | .6 ppm | 0 ppm |
| 30 minutes | .86 ppm | 0 ppm |
| 120 minutes | 3.1 ppm | 1.3 ppm |
| 24 hours | 46.6 ppm | 3.8 ppm |

Electrode A - 50° C.
Electrode B - 25° C.

All values for vanadium level are given in parts per million (ppm).

EXAMPLE XII

This example illustrates the increase in negative electrode surface area resulting from etching the electrode in accordance with the invention. Two electrode specimens were tested for BET surface area using the techniques described in Example VIII. The first electrode specimen was from an as fabricated electrode having an active material composition of $V_{25}Ti_{17}Zr_{16}Ni_{42}$, having been fabricated under standard conditions as in Example IV. The second electrode specimen was taken from the same electrode, but was additionally treated by etching. The specimen was placed in 30% KOH at a temperature of 50° C. for a period of 1 hour. The specimen was then processed for BET testing as specified in Example VIII. The results from this test were:

| Roughness Factor | Surface Area (m/g) |
| --- | --- |
| 92 | .115 |
| 200 | .253 |

From scanning electron microscope (SEM) analysis, no evidence of new surfaces due to crack propagation can be seen. Since the AES studies indicate an oxide thickening, and electrolyte studies verify the removal of part of the surface oxide, it is interpreted that an increase in BET surface area by etching is the actual roughening of existing surfaces.

As used herein, the term "hydrogen storage negative electrode" is an electrode that reversibly stores hydrogen by reversibly forming a hydride.

While the present invention has been described with respect to specific embodiments thereof, it will be understood that various changes and modifications may be made within the scope and spirit of the invention and it is intended that the invention encompass such changes and modifications as fall within the scope of the appended claims.

We claim:

1. A method of activating a rechargeable hydrogen storage negative electrode containing active electrode material, comprising the steps of
    prior to sealing the electrode in a hydrogen storage electrochemical cell:
    (a) electrochemically charging said negative electrode to provide a charge; and thereafter
    (b) discharging at least a portion of said charge, whereby surface roughness of said negative electrode increases and the gas pressure that develops in a sealed hydrogen storage rechargeable electrochemical cell resulting from said negative electrode is reduced.

2. The method of claim 1 wherein said charging step provides a total charge input of from about 100% to 150% of said negative electrode capacity.

3. The method of claim 1 wherein said electrode is charged at a rate of about 50 mA/gram of active material.

4. The method of claim 3 wherein said electrode is discharged at between about 5 and 25 mA/gram of active material.

5. The method of claim 1 wherein said discharging comprises initially discharging at an initial rate and subsequently discharging at a rate lower than said initial rate.

6. The method of claim 1 further comprising subjecting said negative electrode to at least one electrochemical charge and discharge cycle after step (b) of claim 1.

7. The method of claim 1 wherein said negative electrode is suitable for use in a sealed rechargeable hydrogen storage electrochemical cell and said method is performed prior to assembling and sealing said negative electrode in a hydrogen storage electrochemical cell.

8. The method of claim 1 wherein said negative electrode is suitable for use in a sealed rechargeable hydrogen storage electrochemical cell and said method is performed prior to sealing said negative electrode in a hydrogen storage electrochemical cell and after installation of said negative electrode therein.

9. The method of claim 1 wherein said activating increases the discharge rate of said negative electrode.

10. The method of claim 1 wherein said activating increases the capacity of said electrode.

11. The method of claim 1 wherein said activating decreases the charging voltage for said electrode.

12. The method of claim 1 wherein said electrode is discharged to contain a residual amount of hydrogen equivalent to a potential of about $-0.7$ volts versus a Hg/HgO/OH$^-$ reference electrode when discharged at a rate of about 5 mA/gram to 25 mA/gram of active material.

13. A negative electrode made in accordance with the method of claim 1.

14. The method of claim 1 wherein the composition of said active material of said negative electrode is $(TiV_{2-x}Ni_x)_{1-y}M_y$ where $0.2 \leq x \leq 1.0$, $0 \leq y \leq 0.2$ and M=Al or Zr.

15. The method of claim 1 wherein the composition of said active material of said negative electrode is $Ti_{2-x}Zr_xV_{4-y}Ni_y$ where $0 < x \leq 1.5$, $0.6 \leq y \leq 3.5$.

16. The method of claim 1 wherein the composition of said active material of said negative electrode is $Ti_{1-x}Cr_xV_{2-y}Ni_y$ where $0 < x \leq 0.75$, $0.2 \leq y \leq 1.0$.

17. The method of claim 1 wherein the composition of said active material of said negative electrode is about $V_{25}Ti_{17}Zr_{16}Ni_{42}$.

18. The method of claim 1 wherein the composition of said active material of said negative electrode is about $V_{33}Ti_{17}Zr_{16}Ni_{34}$.

19. The method of claim 1 wherein the composition of said active material of said negative electrode is about $V_{53}Ti_{17}Cr_{17}Ni_{13}$.

20. The method of claim 1 wherein said charging and discharging increases the surface roughness of said electrode by up to about ten times.

21. The method of claim 1 wherein said charging and discharging increases the surface roughness of said electrode by about ten times.

22. The method of claim 1 wherein said method of activating improves the charge acceptance and hydrogen transfer properties of said electrode.

23. The method of claim 1 wherein said method of activating provides an electrode surface that is substantially free of material that is soluble in an aqueous alkali metal hydroxide solution.

24. The method of claim 1 wherein said electrode has a concentration of at least 20% on an atomic basis of free metal at the surface of said electrode to a depth of about 100 angstroms from the surface of said electrode as a result of said method of activation.

25. The method of claim 1 wherein said electrode has a greater surface porosity as a result of said method of activating.

26. A method of activating a rechargeable hydrogen storage negative electrode containing active electrode material, comprising the steps of:
    prior to sealing the electrode in a hydrogen storage electrochemical cell, establishing a precharge in said negative electrode corresponding to an amount of hydrogen equivalent to a potential of about $-0.7$ volts versus a Hg/HgO/OH$^-$ reference electrode when discharged at a rate of about 5 mA/gram to 25 mA/gram of active material.

27. The method of claim 26 wherein said precharge is established during fabrication of said negative electrode.

28. The method of claim 26 wherein said precharge is established by thermally absorbing hydrogen in said negative electrode.

29. The method of claim 28 wherein said precharge is established during sintering of said negative electrode.

30. The method of claim 26 further comprising electrochemically charging said electrode and thereafter discharging said electrode to establish said precharge level.

31. The method of claim 30 wherein said charging provides a total charge input of from about 100% to 150% of said negative electrode capacity.

32. The method of claim 26 further comprising subjecting said negative electrode to at least one electrochemical charge and discharge cycles prior to establishing said precharge level.

33. The method of claim 26 wherein said negative electrode is suitable for use in a sealed rechargeable hydrogen storage electrochemical cell and said method is performed prior to assembling and sealing said negative electrode in a hydrogen storage electrochemical cell.

34. The method of claim 26 wherein said negative electrode is suitable for use in a sealed rechargeable hydrogen storage electrochemical cell and said method is performed prior to sealing said negative electrode in a hydrogen storage electrochemical cell and after installation of said negative electrode therein.

35. A negative electrode made in accordance with the method of claim 26.

36. The method of claim 26 wherein the composition of said active material of said negative electrode is $(TiV_{2-x}Ni_x)_{1-y}M_y$ where $0.2 \leq x \leq 1.0$, $0 \leq y \leq 0.2$ and M=Al or Zr.

37. The method of claim 26 wherein the composition of said active material of said negative electrode is $Ti_{2-x}Zr_xV_{4-y}Ni_y$ where $0 < x \leq 1.5$, $0.6 \leq y \leq 3.5$.

38. The method of claim 26 wherein the composition of said active material of said negative electrode is $Ti_{1-x}Cr_xV_{2-y}Ni_y$ where $0 < x \leq 0.75$, $0.2 \leq y \leq 1.0$.

39. The method of claim 26 wherein the composition of said active material of said negative electrode is about $V_{25}Ti_{17}Zr_{16}Ni_{42}$.

40. The method of claim 26 wherein the composition of said active material of said negative electrode is about $V_{33}Ti_{17}Zr_{16}Ni_{34}$.

41. The method of claim 26 wherein the composition of said active material of said negative electrode is about $V_{53}Ti_{17}Cr_{17}Ni_{13}$.

42. A method of activating a rechargeable hydrogen storage negative electrode containing active electrode material having an initial state of charge and surface oxides after fabrication, comprising the steps of prior to sealing the electrode in a hydrogen storage electrochemical cell:
(a) contacting said negative electrode with alkaline material for sufficient time and at sufficient temperature to alter said surface oxides to increase the charge acceptance and electrochemical hydrogen transfer rate of said negative electrode; and
(b) discharging at least a portion of the initial charge, whereby the gas pressure that develops in a sealed hydrogen storage rechargeable electrochemical cell resulting from the negative electrode is reduced.

43. The method of claim 42 wherein said contacting step removes at least a portion of the surface oxides of said negative electrode.

44. The method of claim 42 wherein said electrode is contacted with alkaline solution selected from the group consisting of potassium hydroxide, sodium hydroxide, lithium hydroxide and mixtures thereof.

45. The method of claim 44 wherein the alkaline material comprises potassium hydroxide in an aqueous solution.

46. The method of claim 44 wherein the alkaline solution comprises sodium hydroxide in an aqueous solution.

47. The method of claim 42 wherein said aqueous sodium hydroxide solution further comprises a material selected from the group consisting of sodium carbonate, potassium carbonate and mixtures thereof.

48. The method of claim 42 wherein the oxide permeability is increased as a result of said contacting step.

49. The method of claim 42 wherein said discharging comprises initially discharging at an initial rate and subsequently discharging at a rate lower than said initial rate.

50. The method of claim 42 further comprising electrochemically charging said electrode prior to step (b) of claim 1 and thereafter discharging said electrode.

51. The method of claim 50 further comprising subjecting said negative electrode to at least one electrochemical charge and discharge cycles after step (b) of claim 41.

52. The method of claim 42 wherein said negative electrode is for use in a rechargeable hydrogen storage electrochemical cell and said method is performed prior to assembling and sealing said negative electrode in a hydrogen storage electrochemical cell.

53. The method of claim 42 wherein said negative electrode is for use in a rechargeable hydrogen storage electrochemical cell and said method is performed prior to sealing said negative electrode in a hydrogen storage electrochemical cell and after installation of said negative electrode therein.

54. The method of claim 42 wherein said activating increases the discharge rate of said negative electrode.

55. The method of claim 42 wherein said activating increases the capacity of said electrode.

56. The method of claim 42 wherein said activating decreases the charging voltage for said electrode.

57. The method of claim 42 wherein said electrode is discharged to contain a residual amount of hydrogen equivalent to a potential of about $-0.7$ volts versus a Hg/HgO/OH$^-$ reference electrode when discharged at a rate of about 5 mA/gram to 25 mA/gram of active material.

58. A negative electrode made in accordance with the method of claim 42.

59. The method of claim 42 wherein the composition of said active material of said negative electrode is $(TiV_{2-x}Ni_x)_{1-y}M_y$ where $0.2 \leq x \leq 1.0$, $0 \leq y \leq 0.2$ and M=Al or Zr.

60. The method of claim 42 wherein the composition of said active material of said negative electrode is $Ti_{2-x}Zr_xV_{4-y}Ni_y$ where $0 < x \leq 1.5$, $0.6 \leq y \leq 3.5$.

61. The method of claim 42 wherein the composition of said active material of said negative electrode is $Ti_{1-x}Cr_xV_{2-y}Ni_y$ where $0 < x \leq 0.75$, $0.2 \leq y \leq 1.0$.

62. The method of claim 42 wherein the composition of said active material of said negative electrode is about $V_{25}Ti_{17}Zr_{16}Ni_{42}$.

63. The method of claim 42 wherein the composition of said active material of said negative electrode is about $V_{33}Ti_{17}Zr_{16}Ni_{34}$.

64. The method of claim 38 wherein the composition of said active material of said negative electrode is about $V_{53}Ti_{17}Cr_{17}Ni_{13}$.

65. An electrode made in accordance with the method of claim 46.

66. The method of claim 42 wherein said method of activating improves the charge acceptance and hydrogen transfer properties of said electrode.

67. The method of claim 42 wherein said method of activating provides an electrode surface that is substantially free of material that is soluble in an aqueous alkali metal hydroxide solution.

68. The method of claim 42 wherein said electrode has a concentration of at least 20% on an atomic basis of free metal at the surface of said electrode to a depth of about 100 angstroms from the surface of said electrode as a result of said method of activating.

69. The method of claim 42 wherein said electrode has a greater surface porosity as a result of said method of activating.

70. The method of claim 42 wherein said method of activating increases the surface area of said electrode up to about 10 times.

71. A method of activating a hydrogen storage negative electrode containing active electrode material having surface oxides after fabrication comprising the step of contacting said negative electrode with alkaline material for sufficient time and at sufficient temperature to alter said surface oxides to increase charge acceptance and electrochemical hydrogen transfer rate of said negative electrode, prior to installation and sealing the electrode in a hydrogen storage electrochemical cell.

72. The method of claim 71 further comprising electrochemically charging and discharging said electrode.

73. The method of claim 72 wherein said electrode is subjected to at least one electrochemical charge and discharge cycles.

74. The method of claim 71 wherein at least a portion of the surface oxides are removed by said contacting step.

75. The method of claim 74 wherein the electrode is contacted with alkaline material selected from the group consisting of potassium hydroxide, sodium hydroxide and mixtures thereof.

76. The method of claim 75 wherein the alkaline material comprises potassium hydroxide in aqueous solution.

77. The method of claim 75 wherein the alkaline material comprises sodium hydroxide in an aqueous solution.

78. The method of claim 77 wherein said aqueous sodium hydroxide solution further comprises a material selected from the group consisting of sodium carbonate, potassium carbonate and mixtures thereof.

79. The method of claim 71 wherein the oxide permeability is increased by said contacting step.

80. The method of claim 71 wherein said method of activating improves the charge acceptance and hydrogen transfer properties of said electrode.

81. The method of claim 71 wherein said method of activating provides an electrode surface that is substantially free of material that is soluble in an aqueous alkali metal hydroxide solution.

82. The method of claim 71 wherein said electrode has a concentration of at least 20% on an atomic basis of free metal at the surface of said electrode to a depth of about 100 angstroms from the surface of said electrode as a result of said method of activating.

83. The method of claim 71 wherein said electrode has a greater surface porosity as a result of said method of activating.

84. The method of claim 71 wherein said method of activating increases the surface area of said electrode.

85. The method of claim 72 wherein said activating increases the capacity of said electrode.

86. The method of claim 72 wherein said activating decreases the charging voltage for said electrode.

87. The method of claim 72 wherein the composition of said active material of said negative electrode is $(TiV_{2-x}Ni_x)_{1-y}M_y$ where $0.2 \leq x \leq 1.0$, $0 \leq y \leq 0.2$ and M=Al or Zr.

88. The method of claim 72 wherein the composition of said active material of said negative electrode is $Ti_{2-x}Zr_xV_{4-y}Ni_y$ where $0 < x \leq 1.5$, $0.6 \leq y \leq 3.5$.

89. The method of claim 72 wherein the composition of said active material of said negative electrode is $Ti_{1-x}Cr_xV_{2-y}Ni_y$ where $0 < x \leq 0.75$, $0.2 \leq y \leq 1.0$.

90. The method of claim 72 wherein the composition of said active material of said negative electrode is about $V_{25}Ti_{17}Zr_{16}Ni_{42}$.

91. The method of claim 72 wherein the composition of said active material of said negative electrode is about $V_{33}Ti_{17}Zr_{16}Ni_{34}$.

92. The method of claim 72 wherein the composition of said active material of said negative electrode is about $V_{53}Ti_{17}Cr_{17}Ni_{13}$.

93. The method of claim 72 wherein said electrode is discharged to contain a residual amount of hydrogen equivalent to a potential of about $-0.7$ volts versus a Hg/HgO/OH$^-$ reference electrode when discharged at a rate of about 5 mA/gram to 25 mA/gram of active material.

94. The method of claim 71 further comprising establishing a precharge in said negative electrode for installation in the cell, said precharge corresponding to a potential of about $-0.7$ volts versus a Hg/HgO/OH$^-$ reference electrode when discharged at a rate of about 5 mA/gram to 25 mA/gram of active material.

95. The method of claim 94 wherein said precharge is established during sintering of said negative electrode.

96. The method of claim 94 wherein said precharge is established by thermally absorbing hydrogen in said negative electrode.

97. An electrode made in accordance with the method of claim 71.

98. An electrode made in accordance with the method of claim 72.

99. A method of fabricating a sealed hydrogen storage electrochemical cell having components including a positive hydrogen electrode containing active material, a hydrogen storage negative electrode, separator and electrolyte, where said components are assembled in operative contact and contained within containing means and wherein said hydrogen storage negative electrode has an initial state of charge and surface oxides after fabrication, comprising the steps of:
  (a) activating said hydrogen storage negative electrode by a method comprising contacting said negative electrode with alkaline solution for sufficient time and at sufficient temperature to alter said surface oxides to increase the charge acceptance and electrochemical hydrogen transfer rate of said electrode and discharging at least a portion of the initial charge from said negative electrode;
  (b) assembling said components in said cell and thereafter sealing said cell, while avoiding oxidation of said negative electrode, whereby the gas pressure that develops in a sealed hydrogen storage electrochemical cell utilizing said activated negative electrode is reduced.

100. The method of claim 99 wherein said contacting removes at least a portion of the surface oxides from said negative electrode.

101. The method of claim 99 wherein said negative electrode is contacted with alkaline solution selected from the group consisting of solutions of potassium hydroxide, sodium hydroxide and mixtures thereof.

102. The method of claim 101 wherein the alkaline solution comprises potassium hydroxide in an aqueous solution.

103. The method of claim 99 wherein said discharging comprises initially discharging at an initial rate and subsequently discharging at a rate lower than said initial rate.

104. The method of claim 99 further comprising electrochemically charging said negative electrode and thereafter discharging said negative electrode prior to step (b) of claim 99.

105. The method of claim 104 further comprising subjecting said negative electrode to at least one electrochemical charge and discharge cycle after step (b) of claim 99.

106. The method of claim 99 wherein said negative electrode is discharged to contain a residual amount of hydrogen equivalent to a potential of about $-0.7$ volts versus a $Hg/HgO/OH^-$ reference electrode when discharged at a rate of about 5 mA/gram to about 25 mA/gram of active material.

107. The method of claim 99 wherein the composition of said active material of said negative electrode is $(TiV_{2-x}Ni_x)_{1-y}M_y$ where $0.2 \leq x \leq 1.0$, $0 \leq y \leq 0.2$ and M=Al or Zr.

108. The method of claim 99 wherein the composition of said active material of said negative electrode is $Ti_{2-x}Zr_xV_{4-y}Ni_y$ where $0 < x \leq 1.5$, $0.6 \leq y \leq 3.5$.

109. The method of claim 99 wherein the composition of said active material of said negative electrode is $Ti_{1-x}Cr_xV_{2-y}Ni_y$ where $0 < x \leq 0.75$, $0.2 \leq y \leq 1.0$.

110. The method of claim 99 wherein the composition of said active material of said negative electrode is about $V_{25}Ti_{17}Zr_{16}Ni_{42}$.

111. The method of claim 99 wherein the composition of said active material of said negative electrode is about $V_{33}Ti_{17}Cr_{17}Ni_{34}$.

112. The method of claim 99 wherein the composition of said active material of said negative electrode is about $V_{53}Ti_{17}Cr_{17}Ni_{13}$.

113. An electrochemical cell made in accordance with claim 99.

114. An electrochemical cell made in accordance with the method of claim 104.

115. An activated rechargeable hydrogen storage negative electrode ready for installation in a sealed starved electrochemical cell comprising a body of hydrogen storage active material, said body composed of an agglomeration of particles of active hydrogen storage material, said body containing a residual amount of hydrogen and being substantially free of surface oxides, said residual amount of hydrogen being equivalent to between about 5 mA/gram and 25 mA/gram of active material to a $-0.7$ volt cutoff versus a $Hg/HgO/OH^-$ reference electrode when discharged at a rate of about 5 mA/gram to 25 mA/gram of active material.

116. The electrode of claim 115 wherein said electrode has a surface roughness in the range of from about 800 to about 3000 times the geometric surface of said electrode.

117. The electrode of claim 115 wherein said electrode has a surface roughness of greater than about 1500 times the geometric surface of said electrode.

118. The electrode of claim 115 wherein said electrode has an electrode surface that is substantially free of material that is soluble in an aqueous alkali metal hydroxide solution.

119. The electrode of claim 115 wherein said electrode has a concentration of at least 20% on an atomic basis of free metal at the surface of said electrode to a depth of about 100 angstroms from the surface of said electrode.

120. The electrode of claim 115 wherein said electrode has a surface porosity of at least 1% from the surface of the electrode to a depth from the surface of at least 100 angstroms.

121. The electrode of claim 115 wherein the composition of said active material of said negative electrode is $(TiV_{2-x}Ni_x)_{1-y}M_y$ where $0.2 \leq x \leq 1.0$, $0 \leq y \leq 0.2$ and M=Al or Zr.

122. The electrode of claim 115 wherein the composition of said active material of said negative electrode is $Ti_{2-x}Zr_xV_{4-y}Ni_y$ where $0 < x \leq 1.5$, $0.6 \leq y \leq 3.5$.

123. The electrode of claim 115 wherein the composition of said active material of said negative electrode is $Ti_{1-x}Cr_xV_{2-y}Ni_y$ where $0 < x \leq 0.75$, $0.2 \leq y \leq 1.0$.

124. The electrode of claim 115 wherein the composition of said active material of said negative electrode is about $V_{25}Ti_{17}Zr_{16}Ni_{42}$.

125. The electrode of claim 115 wherein the composition of said active material of said negative electrode is about $V_{33}Ti_{17}Zr_{16}Ni_{34}$.

126. The electrode of claim 115 wherein the composition of said active material of said negative electrode is about $V_{53}Ti_{17}Cr_{17}Ni_{13}$.

127. The electrode of claim 115 wherein the residual hydrogen is set by sintering in an atmosphere containing a desired concentration of hydrogen.

128. A sealed rechargeable hydrogen storage electrochemical cell comprising:
a positive electrode;
a negative electrode comprising an activated rechargeable hydrogen storage negative electrode comprising a body of hydrogen storage active material, said body composed of an agglomeration of particles of active hydrogen storage material, said body containing a residual amount of hydrogen and being substantially free of surface oxides, said residual amount of hydrogen being equivalent to a potential of about $-0.7$ volts versus a $Hg/HgO/OH^-$ reference electrode when discharged at a rate of about 5 mA/gram to 25 mA/gram of active material;
separator means positioned between said positive and negative electrodes, said positive and negative electrodes positioned in said cell in spaced apart operative relation;
electrolyte in contact with said separator means and said positive and negative electrodes; and
sealed container means containing said positive and negative electrodes said separator means and said electrolyte.

129. The cell of claim 128 wherein said electrode has a surface roughness in the range of from about 800 to about 3000 times the geometric surface of said electrode.

130. The cell of claim 128 wherein said electrode has a surface roughness of greater than about 1500 times the geometric surface of said electrode.

131. The cell of claim 128 wherein said negative electrode has an electrode surface that is substantially free of material that is soluble in an aqueous alkali metal hydroxide solution.

132. The cell of claim 128 wherein said negative electrode has a concentration of at least 20% on an atomic basis of free metal at the surface of said negative electrode to a depth of about 100 angstroms from the surface of said negative electrode.

133. The cell of claim 128 wherein said negative electrode has a surface porosity of at least 1% from the surface of the negative electrode to a depth from the surface of at least about 100 angstroms.

134. The cell of claim 128 wherein the composition of said active material of said negative electrode is $(TiV_{2-x}Ni_x)_{1-y}M_y$ where $0.2 \leq x \leq 1.0$, $0 \leq y \leq 0.2$ and M=Al or Zr.

135. The cell of claim 128 wherein the composition of said active material of said negative electrode is $Ti_{2-x}Zr_xV_{4-y}Ni_y$ where $0 < x \leq 1.5$, $0.6 \leq y \leq 3.5$.

136. The cell of claim 128 wherein the composition of said active material of said negative electrode is $Ti_{1-x}Cr_xV_{2-y}Ni_y$ where $0 < x \leq 0.75$, $0.2 \leq y \leq 1.0$.

137. The cell of claim 128 wherein the composition of said active material of said negative electrode is about $V_{25}Ti_{17}Zr_{16}Ni_{42}$.

138. The cell of claim 128 wherein the composition of said active material of said negative electrode is about $V_{33}Ti_{17}Zr_{16}Ni_{34}$.

139. The cell of claim 128 wherein the composition of said active material of said negative electrode is about $V_{53}Ti_{17}Cr_{17}Ni_{13}$.

140. The cell of claim 128 wherein said cell is starved.

141. A battery comprising at least two cells in accordance with claim 128.

* * * * *

UNITED STATES PATENT AND TRADEMARK OFFICE
CERTIFICATE OF CORRECTION

PATENT NO. : 4,716,088

DATED : December 29, 1987

INVENTOR(S) : Benjamin Reichman et al

Page 1 of 8

It is certified that error appears in the above-identified patent and that said Letters Patent is hereby corrected as shown below:

The title page should be deleted to appear as per attached title page.

The sheets of drawings consisting of figure 1-10 should be deleted to appear as per attached sheets figures 1-10.

Signed and Sealed this

Thirtieth Day of August, 1988

Attest:

DONALD J. QUIGG

*Attesting Officer*  *Commissioner of Patents and Trademarks*

United States Patent [19]

Reichman et al.

[11] Patent Number: 4,716,088

[45] Date of Patent: Dec. 29, 1987

[54] ACTIVATED RECHARGEABLE HYDROGEN STORAGE ELECTRODE AND METHOD

[75] Inventors: Benjamin Reichman, Birmingham; Srini Venkatesan, Southfield; Michael A. Fetcenko, Royal Oak; Kenneth Jeffries, Pontiac; Sharon Stahl, Mt. Clemens; Clifford Bennett, Clarkston, all of Mich.

[73] Assignee: Energy Conversion Devices, Inc., Troy, Mich.

[21] Appl. No.: 947,148

[22] Filed: Dec. 29, 1986

[51] Int. Cl.$^4$ .................. H01M 4/36; H01M 10/44
[52] U.S. Cl. .................................. 429/101; 429/209; 429/218; 29/623.1; 420/900; 423/644
[58] Field of Search .................. 429/59, 94, 101, 209, 429/218, 40–42; 423/644; 420/900, 424, 580; 252/181.6; 204/2.1; 29/623.1

[56] References Cited

U.S. PATENT DOCUMENTS

| | | | |
|---|---|---|---|
| 3,669,745 | 6/1972 | Beccu | 429/218 X |
| 3,824,131 | 7/1974 | Beccu | 429/220 X |
| 4,112,199 | 9/1978 | Dunlop et al. | 429/101 X |
| 4,160,014 | 7/1979 | Gamo et al. | 423/644 |
| 4,551,400 | 11/1985 | Sapru et al. | 429/94 |

Primary Examiner—Anthony Skapars
Attorney, Agent, or Firm—Richard M. Goldman; Marvin S. Siskind

[57] ABSTRACT

Activated rechargeable hydrogen storage electrodes that are especially suitable for sealed, starved electrochemical cells and methods for making them are provided. The activated electrode includes a body of hydrogen storage active material that is composed of an agglomeration of particles of active hydrogen storage material. The body contains a residual amount of hydrogen and may have a modified surface, the residual amount of hydrogen generally being equivalent to a potential of about $-0.7$ volts versus a Hg/HgO reference electrode when discharged at a rate of about 5 mA/gram to 25 mA/gram of active material.

The method provided for activating a rechargeable hydrogen storage negative electrode includes contacting the electrode with alkaline material for sufficient time at sufficient temperature to alter the surface oxides on the electrode present on the electrodes after fabrication to increase the charge acceptance and electrochemical hydrogen transfer rate and discharging at least a portion of the initial charge present in the electrode. The surface oxides may be treated by several methods, such as by contact with alkaline material or electrochemically.

141 Claims, 10 Drawing Figures

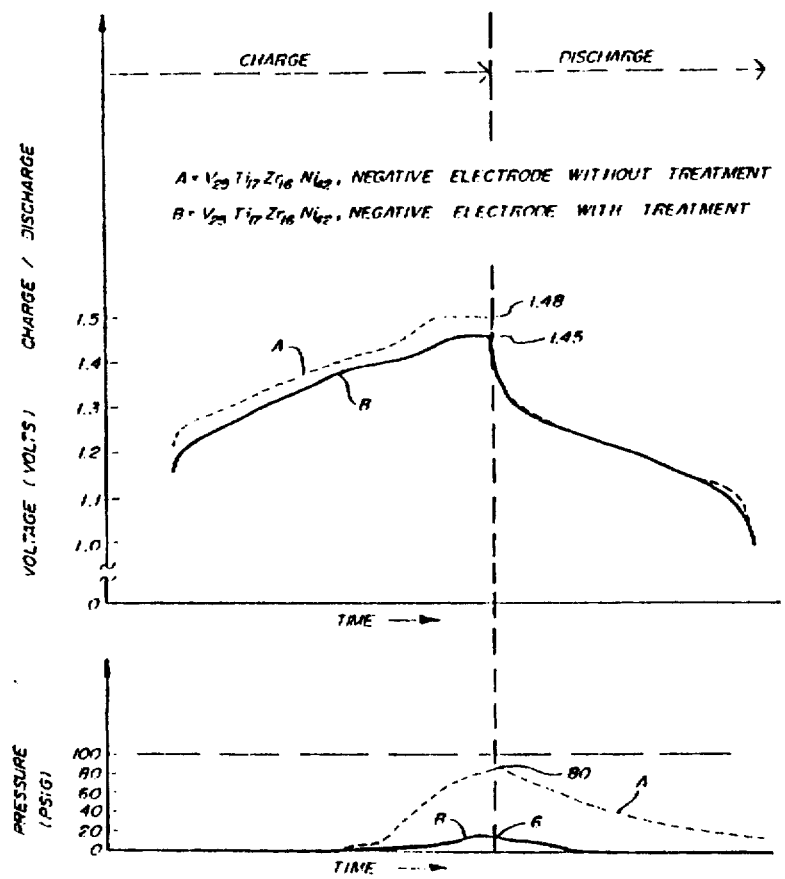

FIG. 4
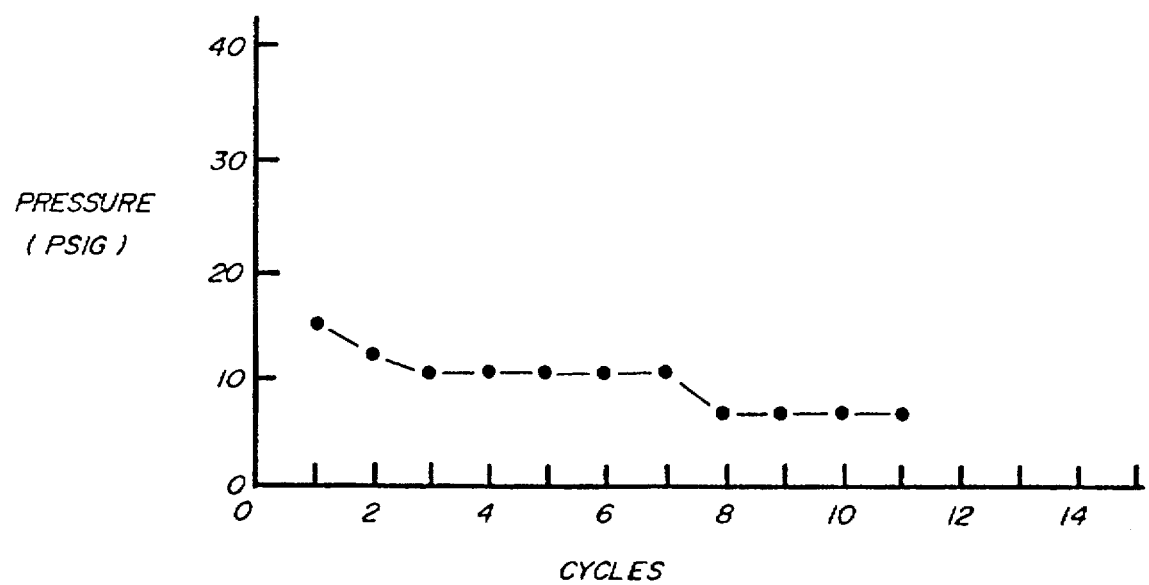
PRESSURE VS. CYCLES FOR SEALED CELL WITH TREATED NEGATIVE ELECTRODE
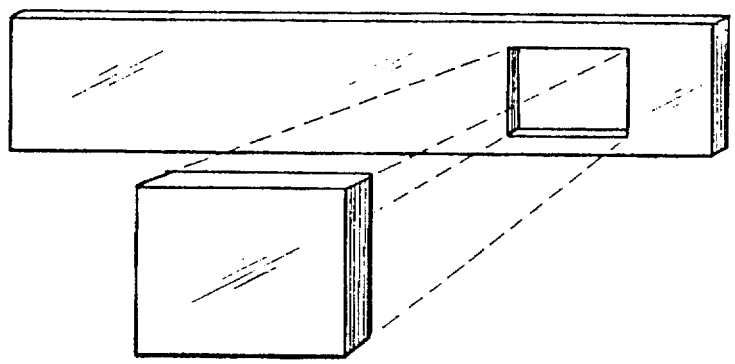
FIG. 5